(12) United States Patent
Salinas et al.

(10) Patent No.: US 7,641,889 B1
(45) Date of Patent: Jan. 5, 2010

(54) HYDROGEN GENERATOR

(75) Inventors: Carlos Salinas, Bryan, TX (US); Alan Cisar, Cypress, TX (US); Eric Clarke, College Station, TX (US); Oliver J. Murphy, Bryan, TX (US); Brad Fiebig, Seguin, TX (US)

(73) Assignee: Lynntech Power Systems, Ltd., College Station, TX (US)

( * ) Notice: Subject to any disclaimer, the term of this patent is extended or adjusted under 35 U.S.C. 154(b) by 1002 days.

(21) Appl. No.: 10/845,971

(22) Filed: May 14, 2004

Related U.S. Application Data

(60) Provisional application No. 60/470,319, filed on May 14, 2003.

(51) Int. Cl.
| | |
|---|---|
| C01B 3/00 | (2006.01) |
| C01B 3/08 | (2006.01) |
| C01B 3/02 | (2006.01) |
| B01J 7/00 | (2006.01) |
| H01M 8/06 | (2006.01) |

(52) U.S. Cl. .................. 423/658.2; 423/657; 423/648.1; 48/61

(58) Field of Classification Search ............ 423/657; 422/239, 162, 211; 205/338; 204/263; 48/61, 48/118.5
See application file for complete search history.

(56) References Cited

U.S. PATENT DOCUMENTS

| | | | |
|---|---|---|---|
| 3,098,769 A | 7/1963 | Herman | |
| 4,155,712 A | 5/1979 | Taschek | |
| 4,261,956 A | 4/1981 | Adlhart | |
| 4,687,423 A | 8/1987 | Maget et al. | |
| 4,886,514 A | 12/1989 | Maget | |
| 5,366,654 A * | 11/1994 | Van Den Brom et al. | ... 134/25.2 |
| 5,372,617 A | 12/1994 | Kerrebrock et al. | |
| 5,593,640 A | 1/1997 | Long et al. | |
| 5,702,491 A | 12/1997 | Long et al. | |
| 5,833,934 A * | 11/1998 | Adlhart | ...... 422/239 |

(Continued)

FOREIGN PATENT DOCUMENTS

DE    14 17 753 A1    10/1968

(Continued)

OTHER PUBLICATIONS

Ronald W. Breault and Jon Rolfe; "Hydrogen Storage Canisters for DOD Fuel Cell Applications Utilizing Chemical Hydrides"; Proceedings of the 39th Power Sources Conference Jun. 12-15, 2000; pp. 184-187.

(Continued)

*Primary Examiner*—Karl E Group
*Assistant Examiner*—Noah S Wiese
(74) *Attorney, Agent, or Firm*—John A. Fortkort; Fortkort & Houston P.C.

(57) ABSTRACT

An apparatus and method apply water to a hydrogen-containing composition, such as a hydride, in the presence of a catalyst that promotes hydrolysis to generate hydrogen in a controlled manner. The amount of catalyst used can be carefully tailored so that the reaction rate is limited by the amount of catalyst present (passive control) or it can be sufficiently large so that the reaction is controlled by the rate of water addition (active control).

41 Claims, 11 Drawing Sheets

U.S. PATENT DOCUMENTS

| | | | |
|---|---|---|---|
| 6,358,488 | B1 | 3/2002 | Suda |
| 6,432,379 | B1 * | 8/2002 | Heung .................... 423/648.1 |
| 6,471,935 | B2 * | 10/2002 | Jensen et al. ................ 423/646 |
| 6,534,033 | B1 | 3/2003 | Amendola et al. |
| 6,746,496 | B1 * | 6/2004 | Kravitz et al. .............. 48/118.5 |
| 2001/0045364 | A1 * | 11/2001 | Hockaday et al. ........... 205/338 |
| 2002/0025462 | A1 * | 2/2002 | Nakanishi et al. ............. 429/19 |
| 2002/0088178 | A1 | 7/2002 | Davis |
| 2003/0009942 | A1 | 1/2003 | Amendola et al. |
| 2003/0014917 | A1 | 1/2003 | Rusta-Sallehy et al. |
| 2003/0180587 | A1 | 9/2003 | Jones et al. |
| 2003/0228505 | A1 | 12/2003 | Tsang |

FOREIGN PATENT DOCUMENTS

| | | |
|---|---|---|
| EP | 1 170 249 A | 1/2002 |
| EP | 1369947 A2 | 10/2003 |
| GB | 2 264 112 A | 8/1993 |
| JP | 63 2220001 A | 9/1988 |
| WO | WO 98/30493 A2 | 7/1998 |
| WO | WO 01/51410 | 7/2001 |
| WO | WO 01/74710 A1 | 10/2001 |
| WO | WO 02/06153 A1 | 1/2002 |

OTHER PUBLICATIONS

Steven C. Amendola, Michael T. Kelly, Stefanie L. sharp-Goldman, M. Saleem Janjua, Nicole C. Spencer, Phillip J. Petillo, and Michael Binder; ; "A Catalytic Process for Generating Hydrogen Gas From Aqueous Borohydride Solutions"; Proceedings of the $39^{th}$ Power Sources Conference Jun. 12-15, 2000; pp. 176-179.

Patent Abstracts of Japan, vol. 013, No. 015; Jan. 13, 1989.

Amendola, S.C. et al.; "An Ultrasafe Hydrogen Generator: Aqueous, Alkaline Borohydride Solutions and RU Catalyst"; Preprints of Symposia—ACS, Division of Fuel Chemistry, American Chemical Society; vol. 44, No. 4, 1999, pp. 864-868 (XP001028503).

* cited by examiner

HYDROGEN GENERATOR

This application claims the benefit of U.S. Provisional Application No. 60/470,319, filed May 14, 2003.

This invention was made with Government support under DAAH01-00-C-R178 awarded by the U.S. Army Aviation and Missile Command. The Government has certain rights in this invention.

BACKGROUND OF THE INVENTION

1. Field of the Invention

The present invention relates generally to the generation of hydrogen gas, such as for use in a fuel cell.

2. Background of the Related Art

A fuel cell is an energy conversion device that efficiently converts the stored chemical energy of a fuel into electrical energy. A proton exchange membrane (PEM) fuel cell is a particular type of fuel cell that generates electricity through two electrochemical reactions that occur at the proton exchange membrane/catalyst interfaces at relatively low temperatures (typically <80° C.). A necessary step in the operation of such fuel cells is the electrochemical oxidation of a fuel, typically hydrogen gas, to produce water. Therefore, finding a convenient source of hydrogen is necessary for the operation of a fuel cell.

The hydrides of some of the lighter metallic elements have been considered as a source of hydrogen for a fuel cell because they possess high concentrations of hydrogen that can be released by hydrolysis. Table 1 lists a number of hydrides of elements from the first and second groups of the periodic table that are useful for hydrogen generation, although the list is not meant to be exhaustive of all hydrides suitable for use in a hydrogen generator. The hydrides in Table 1 are divided into groups of salt-like hydrides and covalent hydrides. Table 1 provides the hydrogen content of each of the neat compounds as well as the hydrogen content of each of the compounds with sufficient water to hydrolyze the neat compound to hydrogen and oxide products, and with sufficient water to hydrolyze the neat compound to hydrogen and hydroxide products.

TABLE 1

Hydrogen Content of Metal Hydrides

| | | Wt % $H_2$ | |
|---|---|---|---|
| Compound | Neat | With Stoichiometric $H_2O$ | Double Stoichiometric $H_2O$ |
| Salt-like Hydrides | | | |
| LiH | 12.68 | 11.89 | 7.76 |
| NaH | 4.20 | 6.11 | 4.80 |
| KH | 2.51 | 4.10 | 3.47 |
| RbH | 1.17 | 2.11 | 1.93 |
| CsH | 0.75 | 1.41 | 1.33 |
| $MgH_2$ | 7.66 | 9.09 | 6.47 |
| $CaH_2$ | 4.79 | 6.71 | 5.16 |
| Covalent Hydrides | | | |
| $LiBH_4$ | 18.51 | 13.95 | 8.59 |
| $NaBH_4$ | 10.66 | 10.92 | 7.34 |
| $KBH_4$ | 7.47 | 8.96 | 6.40 |
| $Mg(BH_4)_2$ | 11.94 | 12.79 | 8.14 |
| $Ca(BH_4)_2$ | 11.56 | 11.37 | 7.54 |
| $LiAlH_4$ | 10.62 | 10.90 | 7.33 |
| $NaAlH_4$ | 7.47 | 8.96 | 6.40 |
| $KAlH_4$ | 5.75 | 7.60 | 5.67 |
| $Li_3AlH_6$ | 11.23 | 11.21 | 7.47 |
| $Na_3AlH_6$ | 5.93 | 7.75 | 5.76 |

The hydrides of the salt-like group continue to react and generate water as long as water is present. In some cases, the reaction products may form a "blocking layer" that slows or stops the reaction by blocking access of the water to the hydride. However, by breaking up or dispersing the blocking layer, the water can again contact the hydride and the reaction immediately returns to its initial rate. By contrast, some of the covalent hydrides react with water only to a limited extent, forming metastable solutions. Fortunately, the decomposition of these hydrides can be accelerated with catalysts so that, in the presence of catalysts, these covalent hydrides react similarly to the salt-like hydrides.

Some examples of hydrolysis reactions of light metal hydrides are shown in Table 2. The hydrogen yields shown in Table 2 are based upon the total mass of the hydrides and the water required for hydrolysis but do not take into account the mass of the hydrogen generator container. When considering the hydrogen yield from a complete hydrogen generator system, the mass of the container must also be taken into account. However, the container for a hydrogen generator that operates at low pressure can be quite light and therefore, the yields from a light weight hydrogen generator may approach the yields shown in Table 2. Table 2 provides the hydrogen yield for the stoichiometric amounts of reactants and the hydrogen yield from the reaction with twice the stoichiometric amount of water supplied.

The reactions shown in Table 2 include two or three hydrolysis possibilities for each of four metal hydrides. The first set of reactions show the ideal case, where the product is hydrogen and a metal oxide (e.g., $MBO_2$). These reactions generally occur only at elevated temperatures. The second set of reactions show the reaction producing a metal hydroxide (e.g., $MB(OH)_4$) although extra water beyond the amount listed in the first column is generally required to achieve complete hydrolysis, even to the hydroxide. The third set of reactions show the expected result from the hydrolysis of these compounds to the stable hydroxide hydrates as the products. The hydroxide hydrate is often the thermodynamically favored product. The effect of this thermodynamics is readily apparent from the comparison, for example, of Equation 10 with Equation 4. (See Table 2).

TABLE 2

Hydrogen Yield from the Hydrolysis of Metal Hydrides

| Reaction | | Hydrogen Yield (wt %) | |
|---|---|---|---|
| | Equation No. | Stoichiometric Water | Double Water |
| Reaction to Oxide | | | |
| $LiBH_4 + 2 H_2O \rightarrow LiBO_2 + 4 H_2$ | 1 | 13.95 | 8.59 |
| $2 LiH + H_2O \rightarrow Li_2O + 2 H_2$ | 2 | 11.89 | 7.76 |
| $NaBH_4 + 2 H_2O \rightarrow NaBO_2 + 4 H_2$ | 3 | 10.92 | 7.34 |
| $LiAlH_4 + 2 H_2O \rightarrow LiAlO_2 + 4 H_2$ | 4 | 10.90 | 7.33 |
| Reaction to Hydroxide | | | |
| $LiBH_4 + 4 H_2O \rightarrow LiB(OH)_4 + 4 H_2$ | 5 | 8.59 | 4.86 |
| $LiH + H_2O \rightarrow LiOH + H_2$ | 6 | 7.76 | 4.58 |
| $NaBH_4 + 4 H_2O \rightarrow NaB(OH)_4 + 4 H_2$ | 7 | 7.34 | 4.43 |
| $LiAlH_4 + 4 H_2O \rightarrow LiAl(OH)_4 + 4 H_2$ | 8 | 7.33 | 4.43 |

TABLE 2-continued

Hydrogen Yield from the Hydrolysis of Metal Hydrides

| Reaction | Equation No. | Hydrogen Yield (wt %) Stoichiometric Water | Double Water |
|---|---|---|---|
| Reaction to Hydrate Complex | | | |
| $LiH + 2 H_2O \rightarrow LiOH \cdot H_2O + H_2$ | 9 | 4.58 | 2.52 |
| $2 LiAlH_4 + 10 H_2O \rightarrow LiAl_2(OH)_7 \cdot H_2O + LiOH \cdot H_2O + 8 H_2$ | 10 | 6.30 | 3.70 |
| $NaBH_4 + 6 H_2O \rightarrow NaBO_2 \cdot 4 H_2O + 4 H_2$ | 11 | 5.49 | 3.15 |

Each of the reactions shown in Table 2 has both advantages and disadvantages as a source of hydrogen. The hydrolysis of lithium borohydride ($LiBH_4$) to an oxide, as shown in Equation 1, produces the highest yield of hydrogen of any of the reactions shown, but only proceeds at high temperature. The hydrolysis of $NaBH_4$ produces nearly as much hydrogen (Equation 3), but uses a less costly starting material. At lower temperature, the hydrolysis reaction of $NaBH_4$ as shown in Equation 7 dominates, but one of the reaction products, $NaB(OH)_4$, is very basic. Since the $BH_4^-$ ion is normally stable towards hydrolysis at high pH, the rate of hydrolysis and the resultant hydrogen generation is reduced by several orders of magnitude in a high pH system.

However, in U.S. Pat. No. 6,534,033 and U.S. Patent Application Pub. No. US 2003/0009942, Amendola, et al. disclosed that a ruthenium catalyst catalyzes the decomposition of $BH_4^-$ to hydrogen and borate even in a high pH system having added NaOH. Amendola disclosed that an aqueous solution of $NaBH_4$ pumped over a catalyst bed produced a controlled hydrogen gas flow. The disclosed catalyst was 5% Ru on an unspecified ion exchange resin. The generation of gas was stopped by stopping the flow of the aqueous solution and restarted by restoring the flow.

In U.S. Patent Application Publication No. 2003/0014917, Rusta-Sallehy, et al. disclosed a system to generate hydrogen by using a chemical hydride in solution and contacting the solution with a catalyst to generate hydrogen. The disclosed process required that the borohydride be present as a solution and also required a pump. Both Rusta-Sallehy and Amendola disclosed systems that used sodium borohydride solutions to generate hydrogen but both have several significant limitations. The solutions required a substantial excess of water that decreased the mass yield of hydrogen. The processes also required pumps, which add to the weight and complexity of the systems. In addition, the aqueous solution is not completely stable. Even under basic conditions, the borohydride gradually hydrolyzes, thereby limiting the shelf-life of the chemical hydride solution.

The hydrolysis of lithium hydride (LiH) also has a high yield if it proceeds to completion as shown in Table 2, but the stability of lithium hydroxide hydrate makes it the stable end product, with a lower hydrogen yield, as shown in Equation 9. As reported in *Proc. 39th Power Sources Conf.*, 184-187 (2000), Breault and Rolfe have shown that when this reaction is carried out in a water starved mode, the reaction proceeds to a mixture of $Li_2O$ and LiOH, with a hydrogen yield of over 8 wt %. However, this water-starved condition was achieved by injecting water throughout the mass of hydride in a slow, controlled manner using a complex mechanical control system, thereby substantially reducing the wt % yield of hydrogen from the generator system.

Storing sodium borohydride as a solution for use as a hydrogen source has been disclosed by Tsang in U.S. Patent Application Pub. 2003/0228505. Tsang disclosed metering an aqueous sodium borohydride solution over a ruthenium supported catalyst to generate hydrogen. To overcome the limitations of both reactivity and stability, Tsang disclosed storing the sodium borohydride prior to use in a solution having 5-40 wt % alkali hydroxide or alkaline metal hydroxide. At these very high pH levels, Tsang disclosed that sodium borohydride may be stored in solution for at least 6 to 12 months since the high pH renders the borohydride essentially non-reactive even in the presence of catalyst.

Tsang further disclosed mixing the high pH solution with water just before passing the solution over the supported catalyst in the hydrogen generator. Mixing with water brought the concentration of the high pH borohydride solution into the "reactive" range, which Tsang disclosed is less than about 10 wt % strong base. While Tsang disclosed the desirability of having high concentrations of borohydride in the solution passing over the supported catalyst, the final mixed solution was disclosed as being between 5 and 15 wt %. Tsang noted that the maximum solubility of sodium borohydride in water at room temperature is about 55 wt %. Tsang further disclosed that the best mode practice was to meter the two solutions with two different pumps and mix the solutions just upstream of the supported catalyst. The system and methods disclosed by Tsang do not address or solve the problems of making a light weight hydrogen generator because the two required pumps and the hydroxide necessary for storing the borohydride solution add significant weight to the disclosed hydrogen generator.

Weight is a characteristic of electrochemical cells generally, and fuel cells in particular, that limit their use. Therefore, significant efforts have been directed at providing lightweight components for electrochemical cells and electrochemical cell systems, such as fuel cell systems. Accordingly, there is a need for a lightweight generator of hydrogen gas for fueling fuel cells. It would be desirable to provide a hydrogen generator that is lightweight and portable, and adaptable for a variety of uses, including but not limited to PEM fuel cells. It would be further desirable to provide a hydrogen generator and related method that efficiently produces high quality hydrogen gas. It would be further desirable to have a hydrogen generator that can be accurately and easily controlled.

SUMMARY OF THE INVENTION

The present invention provides hydrogen generators and methods for controlling hydrogen generation. The present invention further provides compositions for storing hydrogen for later release and methods of making the blended composition. The rate of hydrogen generation may be actively controlled by varying the rate that water is added to the hydrogen-containing composition or passively controlled by modifying the hydrogen-containing composition so that an expected hydrogen generation rate is initiated upon adding all the water at one time.

One embodiment of a passively controlled hydrogen generator comprises a reaction chamber for containing a hydrogen-containing composition comprising a hydride and a catalyst. The hydrogen-containing composition has a set catalyst concentration to provide the expected or set rate of hydrogen gas generation desired upon adding an aqueous solution into the reaction chamber. Means are coupled, preferably detachably coupled, to an inlet port of the reaction chamber for adding the aqueous solution all at once into the reaction chamber.

The passively controlled hydrogen generator includes an outlet port from the reaction chamber for produced hydrogen to exit the generator. Both the inlet port and the outlet port of the reaction chamber may comprise fluid control devices such as, for example, a check valve, a ball valve, a gate valve, a globe valve, a needle valve or combinations thereof. These control devices may further comprise one or more pneumatic or electric actuators and the hydrogen generator may further include a controller in electric or pneumatic communication with one or more of these actuators for controlling the open or closed position of the fluid control devices.

Generally, any hydride or combinations of hydrides that produce hydrogen upon contacting water at temperatures that are desired within the hydrogen generator are useful for the present invention. Salt-like and covalent hydrides of light metals, especially those metals found in Groups I and II and even in Group III of the Periodic Table, are useful and include, for example, hydrides of lithium, sodium, potassium, rubidium, cesium, magnesium, beryllium, calcium, aluminum or combinations thereof. Preferred hydrides include, for example, borohydrides, alanates, or combinations thereof.

Useful catalysts for the hydrogen-containing composition include one of more of the transition metals found in Groups IB-VIII of the Periodic Table. The catalyst may comprise one or more of the precious metals and/or may include cobalt, nickel, tungsten carbide or combinations thereof. Ruthenium, ruthenium chloride and combinations thereof is a preferred catalyst. The catalyst form may be selected from powders, blacks, salts of the active metal, oxides, mixed oxides, organometallic compounds or combinations thereof. For those catalysts having a form of an active metal, an oxide, mixed oxides or combinations thereof, the hydrogen generator may further comprise a support for supporting the catalyst on a surface of the support.

Catalyst concentrations in the hydrogen-containing composition may range widely. For some applications, the set catalyst concentration may range between about 0.1 wt % and about 20 wt % active metals based on the total amount of hydride and the active element or elements in the catalyst. Preferably the set catalyst concentration may range from between about 0.1 wt % and about 15 wt % and more preferably, between about 0.3 wt % and about 7 wt %.

The hydrogen-containing composition may take the form of one or more pellets or the form of pellets, granules, powder, tablets or combinations thereof. The hydrogen-containing compositions may further comprise a wicking agent such as a hydrophilic organic material. The wicking agent may further be selected from cellulose fibers, polyester, polyacrylamide or combinations thereof. The hydrogen-containing composition may comprise at least 0.5 wt % wicking agent.

The aqueous solution comprises at least 51% water. The aqueous solution may further comprise an antifoam agent such as a surfactant, a glycol, a polyol or combinations thereof and may further comprise an acid, such as mineral acids, carboxylic acids, sulfonic acids, phosphoric acids or combinations thereof. Even though an antifoam agent may be a component of the aqueous solution, the hydrogen generator may further comprise a fluid separation device for removing liquid from generated hydrogen gas, wherein the hydrogen gas flows through the fluid separation device to the outlet port.

In some embodiments, the hydrogen-containing composition is supported on a porous substrate, such as a foam. The foam may be metal such as, for example, aluminum, nickel, copper, titanium, silver, or stainless steel or may also be made of carbon. The surface of the substrate may be treated to increase a hydrophilic nature of the surface and further, pores of the porous substrate may be used to hold the hydrogen-containing composition.

In another embodiment of a passively controlled hydrogen generator, the hydrogen generator comprises a reaction chamber for containing a porous substrate, wherein the porous substrate supports a mixture comprising a hydride and a catalyst, the mixture having a set catalyst concentration to provide an expected rate of hydrogen gas generation upon adding an aqueous solution into the reaction chamber. Preferred hydrides include those of a light metal selected from lithium, sodium, potassium, rubidium, cesium, magnesium, beryllium, calcium, aluminum or combinations thereof. Any of the hydrides and catalysts discussed above are suitable for use with a porous substrate in a passively controlled hydrogen generator.

The porous substrate may be made of a metal or of carbon. A preferred porous substrate is a foam made, for example, of aluminum, nickel, copper, titanium, silver, stainless steel or carbon. The surface of the substrate may be treated to increase a hydrophilic nature of the surface. At least a portion of the catalyst may be blended with the hydride and placed in the pores of the porous substrate. Furthermore, at least a portion of the catalyst may be applied to a surface of the porous substrate. Any catalyst applied to the surface of the porous substrate contributes to the overall mixture of catalyst and hydride.

Another embodiment of the present invention includes an actively controlled hydrogen generator comprising a reaction chamber for holding a hydrogen-containing composition comprising a hydride and a reservoir comprising an outlet port in fluid communication with a reaction chamber inlet. The hydrogen generator further comprises means for adjusting a flow rate of an aqueous solution from the reservoir into the reaction chamber to control a hydrogen gas generation rate. In addition to the inlet port, the reaction chamber further comprises an outlet port for the produced hydrogen to exit the hydrogen generator.

The outlet port and the inlet port may further comprise a first and a second fluid control device for controlling flow through the outlet and inlet ports respectively. These fluid control devices may be a check valve, a gate valve, a ball valve, a needle valve, or combinations thereof. Furthermore, the fluid control devices may include one or more actuators and the hydrogen generator may further comprise a controller in communication with the one or more actuators via electric or pneumatic means.

Generally, any hydride or combinations of hydrides that produce hydrogen upon contacting water at temperatures that are desired within the hydrogen generator are useful for the present invention. Salt-like and covalent hydrides of light metals, especially those metals found in Groups I and II and even in Group III of the Periodic Table, are useful and include, for example, hydrides of lithium, sodium, potassium, rubidium, cesium, magnesium, beryllium, calcium, aluminum or combinations thereof. Preferred hydrides include, for example, borohydrides, alanates, or combinations thereof. The hydride may be either a salt-like hydride or a covalent hydride or combinations thereof.

The hydrogen-containing composition may further comprise a catalyst that may be blended or otherwise mixed with the hydride. The catalyst may be one or more transition metals. Catalysts suitable for the passively controlled hydrogen generator discussed above, both in type and form, are useful for the actively controlled embodiments of the present invention. The catalyst concentration in the hydrogen-containing composition may range between about 5 wt % and about 20 wt % active element or elements of the catalyst and preferably, between about 6 wt % and about 12 wt % active element or elements of the catalyst. Wicking agents may be added to the hydrogen-containing composition as discussed above. The aqueous solution suitable for the passively controlled hydrogen generator is equally useful for the actively controlled hydrogen generator. Furthermore, the porous substrate suitable for supporting the hydrogen-containing composition of the passively controlled hydrogen generator is suitable for use with the actively controlled hydrogen generator.

The actively controlled hydrogen generator may further comprise a fluid separation device for removing liquid from generated hydrogen gas, wherein the hydrogen gas flows through the fluid separation device to the outlet port.

In one embodiment, the means for adjusting a flow rate of the aqueous solution into the reaction chamber comprises a plunger slideably disposed within the reservoir for pressurizing the aqueous solution and may further comprise a gas source in fluid communication with a gas side of the plunger. The gas source may be an electrolyzer in fluid communication with the gas side of the plunger. A controller may be utilized for adjusting an electrical current flowing from a power source to the electrolyzer in response to a hydrogen generation demand.

The hydrogen generator may further comprise a water chamber for containing the aqueous solution reservoir which may be, for example, an inflatable bladder. The means for adjusting a flow rate of the aqueous solution may then comprise a gas source in fluid communication with an interior of the water chamber. The gas source may be an electrolyzer for controllably generating the gas for delivery to the interior of the water chamber. The means for adjusting a flow rate of the aqueous solution may further comprise a controller for adjusting an electrical current flowing from a power source to the electrolyzer. The electrolyzer may obtain electrolyzer water either from the interior of the water chamber or the interior of the inflatable bladder.

The present invention further comprises a method for a hydrogen-containing composition, comprising dissolving a hydride and a catalyst in a solvent, evaporating the solvent, and recovering the hydrogen-containing composition as a solid. The hydride may be a covalent hydride. The covalent hydride maybe of a light metal selected, for example, from lithium, sodium, potassium, rubidium, cesium, magnesium, beryllium, calcium, aluminum or combinations thereof. Preferred hydrides include a borohydride, an alanate, or combinations thereof.

The catalyst may be one or more transition metals, such as one or more precious metals or ruthenium, ruthenium chloride or combinations thereof. Preferred catalysts include cobalt acetylacetonate, nickel acetylacetonate, ruthenium acetylacetonate, platinum acetylacetonate or combinations thereof because of their solubility in an organic solvent.

The solvent is non-reactive with the hydride and is typically organic. Preferable solvents include, for example, tetrahydrofuran, ethylene glycol ethers, anhydrous ammonia, substituted amines, pyridine or combinations thereof.

Another method for a hydrogen-containing composition of the present invention includes dissolving a hydride in a solvent to form a solution, suspending a catalyst throughout the solution, evaporating the solvent, and recovering the hydrogen-containing composition as a solid. Preferably, the catalyst is in a form of a powder. The hydride may be a covalent hydride and is typically selected from hydrides of light metal selected from lithium, sodium, potassium, rubidium, cesium, magnesium, beryllium, calcium, aluminum or combinations thereof.

The catalyst may be selected from one or more transition metals. Preferred catalysts include ruthenium, ruthenium chloride, or combinations thereof. Preferred solvents include, for example, tetrahydrofuran, ethylene glycol ethers, anhydrous ammonia, substituted amines, pyridine or combinations thereof.

The foregoing and other objects, features and advantages of the invention will be apparent from the following more particular description of a preferred embodiment of the invention, as illustrated in the accompanying drawings wherein like reference numbers represent like parts of the invention.

BRIEF DESCRIPTION OF THE DRAWINGS

So that the above recited features and advantages of the present invention can be understood in detail, a more particular description of the invention, briefly summarized above, may be had by reference to the embodiments thereof that are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Figure 1:
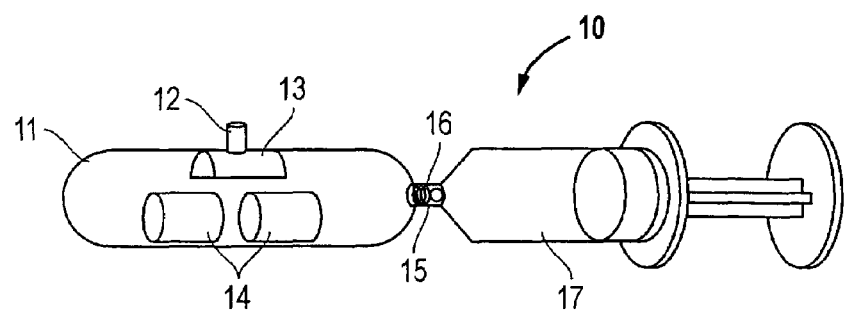
FIG. 1 is a schematic of a passively controlled hydrogen generator.

The present invention provides a hydrogen generator and methods for controlling hydrogen generation. The present invention further provides compositions for storing hydrogen for later release and methods of making the blended composition. The rate of hydrogen generation may be controlled by either varying the rate that water is added to the composition or by modifying the composition so that an expected hydrogen generation rate is initiated upon adding all the water at one time.

As shown in Table 1 and Table 2 above, the hydrides of many of the light metals appearing in the first, second and third groups of the periodic table contain a significant amount of hydrogen on a weight percent basis and release their hydrogen by a hydrolysis reaction upon the addition of water. The hydrolysis reactions that proceed to an oxide and hydrogen, see Table 2, provide the highest hydrogen yield but are not useful for generating hydrogen in a lightweight hydrogen generator that operates at ambient conditions because these reactions proceed only at high temperatures. Therefore, the most useful reactions for a lightweight hydrogen generator that operates at ambient conditions are those reactions that proceed to hydrogen and a hydroxide. Both the salt-like hydrides and the covalent hydrides are useful compounds for hydrogen production because both proceed to yield the hydroxide and hydrogen.

The salt-like hydrides, e.g., LiH, NaH, $MgH_2$, are generally not soluble in any normal molecular solvent under near ambient conditions and many are only stable as solids, decomposing when heated rather than melting congruently. These compounds react spontaneously with water to produce hydrogen and continue to react as long as there is contact between the water and the salt-like hydride. In some cases the reaction products may form a blocking layer that slows or stops the reaction, but breaking up or dispersing the blocking layer immediately returns the reaction to its initial rate as the water can again contact the unreacted hydride. Methods for controlling the hydrogen production from the salt-like compounds generally include controlling the rate of water addition.

The covalent hydrides shown in Table 1 are comprised of a covalently bonded hydride anion, e.g., $BH_4^-$, $AlH_4^-$, and a simple cation, e.g., $Na^+$, $Li^+$. These compounds are frequently soluble in high dielectric solvents, although some decomposition may occur. For example, $NaBH_4$ promptly reacts with water at neutral or acidic pH but is kinetically quite slow at alkaline pH. When $NaBH_4$ is added to neutral pH water, the reaction proceeds but, because the product is alkaline, the reaction slows to a near stop as the pH of the water rises and a metastable solution is formed. In fact, a basic solution of $NaBH_4$ is stable for months at temperatures below 5° C.

Some of the covalent hydrides, such as $LiAlH_4$, react very similarly to the salt-like hydrides and react with water in a hydrolysis reaction as long as water remains in contact with the hydrides. Others covalent hydrides react similarly to $NaBH_4$ and $KBH_4$ and only react with water to a limited extent, forming metastable solutions. However, in the presence of catalysts, these metastable solutions continue to react and generate hydrogen.

Using a catalyst to drive the hydration reaction of the covalent hydrides to completion by forming hydrates and hydrogen is advantageous because the weight percent of hydrogen available in the covalent hydrates is generally higher than that available in the salt-like hydrides, as shown in Table 1. Therefore, the covalent hydrides are preferred as a hydrogen source in some embodiments of a hydrogen generator because of their higher hydrogen content as a weight percent of the total mass of the generator.

Generally, any hydride or combinations of hydrides that produce hydrogen upon contacting water at temperatures that are desired within the hydrogen generator are useful for the present invention. Salt-like and covalent hydrides of light metals are useful and include, for example, hydrides of lithium, sodium, potassium, rubidium, cesium, magnesium, beryllium, calcium, aluminum or combinations thereof.

Examples of catalysts that are useful for the decomposition of covalent hydrides such as borohydrides include precious metals such as ruthenium, platinum, palladium, gold, silver, iridium, rhodium and osmium. Other transition metals are also useful catalysts, such as cobalt and nickel, and one or more of the transition metals (Groups IB-VIII of the Periodic Table) may be selected as a useful catalyst. Examples of other useful catalysts include metallic compounds such as tungsten carbide. All of these examples of catalytic materials are useful in a variety of forms, including powders, blacks, salts of the active metal, oxides, mixed oxides, compounds formed by chelation, organometallic compounds, supported metals, and supported oxides. Supported catalysts include those having an active metal that is supported on the surface of an inactive or slightly active support, such as $Al_2O_3$, carbon, $SiO_2$, etc. Catalysts may also be used in the form of a solid solution with an expensive active metal diluted with a less expensive but inactive one. Whether blended with a hydride or applied to the surface of a substrate, all of these forms of catalyst are useful in accordance with the present invention.

As shown above in Table 2, the hydrolysis reaction of the borohydride ion may proceed to the hydroxide or to complex hydrates. The hydrate $NaBO_2 \cdot 2H_2O$ is the stable form of sodium borate above 54° C., but below this temperature, the stable form is the tetrahydrate, $NaBO_2 \cdot 4H_2O$. The sodium borate produced by the reaction is basic, so in the absence of a catalyst the reaction is self-limiting.

Ruthenium is an effective catalyst for the hydrolysis of $BH_4^-$, most likely in a reduced form as shown in equation 12:

$$Ru(OH)_3 + \tfrac{3}{2}H_2 \rightarrow Ru^0 + 3H_2O \quad (12)$$

While not limiting the invention, the active form of ruthenium in the hydrolysis reaction is most likely the reduced form because the use of reduced ruthenium produces an immediate and vigorous reaction, with no further increase in rate. However, catalysts containing oxidized ruthenium species, such as ruthenium chloride, show an initial reaction that accelerates with time. The acceleration occurs as the ruthenium chloride is reduced, thereby providing the reduced ruthenium as a catalyst for the reaction.

The present invention provides methods for forming hydrogen-containing compositions comprising at least one hydride and further comprising catalyst. The catalyst may be mixed with one or more hydrides for use in hydrogen generators. Preferably the hydrides and catalyst form a blend. A blend is a mixture of components that are thoroughly mixed and intermingled. One method of forming a blend of the catalyst and hydride includes grinding the hydride together with the catalyst to form granules or a fine powder. The blend may be packaged for use as granules or a powder or alternatively, the powder may be pressed into pellets, tablets, or granules. Mixtures in any form are, however, also suitable for use in a hydrogen generator.

Another method for producing a catalyst-hydride blend includes dissolving the catalyst and the hydride in a solvent to produce a solution and then evaporating the solvent to produce the catalyst-hydride blend. Examples of hydrides that may be used in this method include, but are not limited to, sodium borohydride, potassium borohydride, lithium borohydride and combinations thereof. Blended hydride compositions have properties that are a combination of the properties of the two pure materials. For example, lithium borohydride ($LiBH_4$) has a formula weight that is 42% less than that of $NaBH_4$ but produces the same volume of hydrogen per mole of reactant. Even when the amount of water required to stoichiometrically hydrolyze it to $LiB(OH)_4$ is included, the combined mass is nearly 14% less. This weight advantage can be realized in a lightweight hydrogen generator either by using the lithium salt in place of the sodium salt or by using blends of $LiBH_4$ and $NaBH_4$ The solvent used in this method for producing a catalyst-hydride blend is preferably selected from solvents that are non-reactive with the hydride and that also solvate the catalyst or catalyst precursor, whichever is used. A catalyst precursor, such as $RuCl_3$, transforms into a catalyst, such as reduced ruthenium, in the presence of water and the hydride. Many of the useful solvents are organic and include, but are not limited to, tetrahydrofuran (THF), ethylene glycol ethers, anhydrous ammonia, substituted amines, pyridine and combinations thereof. The hydrides are dissolved in the solvent in concentrations up to and including their saturation level and preferably, at their saturation level. Catalyst concentrations range between about 0.1 wt % and about 20 wt % active metal based on the total amount of hydride and the active element or elements in the catalyst. Preferred concentration may range between about 0.3 wt % and about 12 wt % or more preferably, between about 0.4 wt % and about 9 wt %.

Although any of the catalysts previously mentioned may be used in this solvent method for producing a catalyst-hydride blend, catalysts in the form of organic complexes of catalytically active metals are preferred because these materials are highly soluble in organic solvents. Examples of such materials include cobalt acetylacetonate, nickel acetylacetonate, ruthenium acetylacetonate, platinum acetylacetonate and combinations thereof.

In the solvent method of producing a catalyst-hydride blend, the step of evaporating the solvent may include using a rotary evaporator to remove the solvent. Using a rotary evaporator is useful for making small batches of a catalyst-hydride blend for laboratory use, but is not preferred for larger batches because there is a risk of producing non-uniform mixtures of the catalyst and hydride. Flash drying or spray drying is preferred for the step of drying the solvent for production of larger batches. In flash drying, the solvent is heated to a temperature far above its boiling point but kept as a liquid under pressure. When the pressure is released, immediate vaporization occurs resulting in the formation of a fine, uniform powder that is the catalyst-hydride blend. In spray drying a mist of the solution is sprayed into a stream of heated air where the solvent evaporates and the solids are collected. Alternate methods of evaporating the solvent are also useful as known to those having ordinary skill in the art. Such alternate methods include, for example, drying the solution on a heated roll. The blend may be packaged for use as a powder or alternatively, the powder may be pressed into pellets, tablets, or granules.

The present invention further provides a method useful for producing a catalyst-hydride blend of non-soluble catalysts with a soluble hydride. The method includes dissolving the hydride in a solution to form a saturated hydride solution as discussed above and dispersing or suspending a catalyst in the form of a fine powder throughout the solution. Any of the catalysts discussed previously may be dispersed as a fine powder throughout the solution. One preferred catalyst useful in this method is ruthenium, which may be used in forms such as ruthenium black, ruthenium on a support, ruthenium chloride and combinations thereof. As before, the hydrides are dissolved in the solvent in concentrations up to and including their saturation level and preferably, at their saturation level. Catalyst concentrations range between about 0.1 wt % and about 20 wt % active metal based on the total amount of hydride and the active element or elements in the catalyst. Preferred concentration may range between about 0.3 wt % and about 12 wt % or more preferably, between about 0.4 wt % and about 9 wt %.

The method further includes the step of evaporating the solution containing the dispersed catalyst powder by known drying means, such as spray drying, drying the solution on a heated roll, flash drying or drying in a rotary evaporator. After the solvent has been evaporated, each of the dry particles is coated relatively evenly with a coating of the hydride. The blend may be packaged for use as a powder or alternatively, the powder may be pressed into pellets, tablets, or granules.

The methods of the present invention that provide blends or mixtures of a covalent hydride and a catalyst are useful because the resulting blends or mixtures react with water to generate hydrogen in the same manner as do the salt-like hydrides; i.e., the mixed composition continues to produce hydrogen as long as water is available for reaction. Therefore, when a covalent hydride is mixed with a catalyst, the rate of the hydration reaction that produces hydrogen can be controlled by the rate of water addition. It should be noted that some covalent hydrides, such as $LiAlH_4$, do produce hydrogen as long as water is available for reaction without being mixed with a catalyst.

The amount of catalyst added to the catalyst-hydride blend or mixture is important because the concentration of catalyst in the blend or mixture can control the hydration reaction rate and therefore, the rate of hydrogen generation. For example, if only a small amount of catalyst is added to the blend or mixture, then the diffusion rate of the hydride to the catalyst controls the rate of reaction, not the rate of water addition. With diffusion rate controlling the rate of reaction, the hydration reaction can be gradual, which results in a gradual release of hydrogen.

The hydration reaction of a hydride cannot proceed if water is unable to reach the hydride. When pellets of some hydrides, such as LiH, react with water, a layer of insoluble reaction products is formed that blocks further contact of the water with the hydride. The blockage can slow down or stop the reaction. Adding a wicking agent within the pellets or granules of the hydrogen-containing composition that contains the hydride improves the water distribution through the pellet or granule and ensures that the hydration reaction quickly proceeds to completion. Both salt-like hydrides and covalent hydrides benefit from an effective dispersion of water throughout the hydride. Useful wicking materials include, for example, cellulose fibers like paper and cotton, modified polyester materials having a surface treatment to enhance water transport along the surface without absorption into the fiber, and polyacrylamide, the active component of disposable diapers. The wicking agents may be added to the hydrogen-containing composition in any effective amount, preferably in amounts between about 0.5 wt % and about 15 wt % and most preferably, between about 1 wt % and about 2 wt %. It should be noted, however, that variations in the quantity of wicking material added to the hydrogen-containing composition do not seem to be significant; i.e., a small amount of wicking material is essentially as effective as a large amount of wicking material.

The present invention further provides supporting composites that include catalysts, metal hydrides and/or wicking agents disposed in and/or on foams or other porous structures. One embodiment of the present invention includes filling the pores of a porous substrate, such as a foam, with a hydrogen-containing composition. Foams can be useful for conducting heat out of the reaction mass, for keeping the hydrogen-containing composition as a solid mass, for supporting the catalyst, and, with proper surface treatment, for delivering water into the core of the reaction mass. A wide variety of foams or other porous substrates, both metallic and nonmetallic, may be used.

In one embodiment, the hydrogen-containing composition is disposed on a porous foam having good thermal conductivity to help dissipate the heat of reaction. Some examples of suitable foams include aluminum, nickel, copper, titanium, silver, stainless steel, and carbon.

For example, nickel foam can be rendered much more hydrophilic than the original metal surface by oxidizing the surface of nickel foam. The hydrophilic surface aids the distribution of water throughout the mass of the hydrogen-containing composition that is contained within the pores of the foam. Optionally, either separately or in combination with a hydrophilic surface treatment, wicking materials may be added to the hydrogen-containing composition before filling the pores of the foam, such as by assembling the hydride with a hydrophilic binder or blending the hydride with a wicking agent or other hydrophilic material. In any of these variations or their combination, or other methods known to those having ordinary skill in the art, the objective is to provide means for distributing the water throughout the reaction mass to produce a smooth, even hydrolysis reaction.

The catalyst can be blended or mixed with the hydride before placing the hydrogen-containing composition into the pores of the porous material or the catalyst may be applied to the surface of the porous material prior to loading the hydride. When sufficient catalyst is blended with the hydride, the hydration reaction is best controlled through the rate of water addition as a hydrogen generator having active hydrogen generation control. Alternatively, the catalyst may be applied to the surface of the foam or other porous material to reduce the degree of intimate contact and thereby limit the hydration reaction to the rate of diffusion of the hydride to the catalyst as for a hydrogen generator having passive hydrogen generation control. The catalyst can be applied to the porous material by a variety of means including, for example, painting a solution or suspension onto the surface of the substrate and by plating a metallic catalyst onto a conductive support. Optionally, a smaller amount of catalyst may also be blended with the hydride packed into the pores of the porous substrate with or without applying additional catalyst to the surface of the porous substrate to control the hydration reaction by the rate of diffusion of the hydride to the catalyst.

In another embodiment of the present invention, the finely ground hydride is dispersed in an inert organic liquid to provide a fluid mixture. By dispersing a hydride throughout a saturated solution of the same or a different hydride, fluid mixtures can be produced having extremely high concentrations of the hydrides. Water may be mixed with or mixed into the dispersion to evolve hydrogen. A catalyst may also be placed in solution as disclosed above with the dispersed hydride.

A variety of solvents are useful for dissolving hydrides in low to moderate concentrations and for dispersing additional hydride to provide a fluid mixture. Examples of such solvents include tetrahydrofuran (THF), ethylene glycol ethers, isopropanol, monoethanolamine, ethylenediamine, ethylamine, other mono- and di-substituted amines, dimethylformamide (DMF), dimethylacetamide, dimethylsulfoxide (DMSO), and pyridine for sodium borohydride, diethyl ether for lithium borohydride, and diethyl ether, THF and other ethers for lithium aluminum hydride.

If the hydride reacts promptly with the water, such as $LiAlH_4$ or $LiBH_4$, stirring water into the dispersion leads to an immediate and quantitative release of hydrogen. If the supporting solvent is hydrophobic, the reaction is relatively slow in the absence of mixing.

The present invention further provides embodiments of a hydrogen generator having passive control of the rate of hydrogen generation from a metal hydride. Controlling the hydrogen generation rate through the rate of diffusion of the hydride to the water is passive control. Therefore, setting factors that affect the diffusion rate provides a hydrogen generator that generates an expected and desired amount of hydrogen.

It is typical for all or most of the water to be added to the hydrogen-containing composition all at once in a passively controlled hydrogen generator. For example, the water addition may be batch or semi-batch, although it may also be continuous. The rate of reaction is passively controlled at a rate determined by factors that include the amount of water added, the amount of catalyst used, the catalyst activity, the amount of hydride used and the form of the hydrogen-containing composition contained within the hydrogen generator, e.g., pellets, granules, tablets or powder with or without wicking agents. Since the hydride reacts by diffusing to the catalyst, the rate of hydrogen generation can be reduced by providing less catalyst available for reaction. The passive hydrogen generator provides a very simple system that lends itself to applications where size and weight of the hydrogen generator system are critical factors.

Catalyst concentrations in the hydrogen-containing composition for a passively controlled hydrogen generator may range widely. For some applications, the set catalyst concentration may range between about 0.1 wt % and about 20 wt % active metal based on the total amount of hydride and the active element or elements in the catalyst. Preferably the set catalyst concentration may range from between about 0.1 wt % and about 15 wt % and more preferably, between about 0.3 wt % and about 7 wt %.

The exact shape of a hydrogen generator based on passive control is quite flexible making it possible to tailor the form of the device to the application. A wide range of materials can be used to fabricate the generators, with the specific materials mentioned herein only serving as examples. For example, the hydrogen generator may be formed of an alkaline resistant polymer, metal, carbon, graphite or combinations thereof. Examples of configurations of the hydrogen generator include tubular, box-like or bag-like containers.

Some embodiments of a passively controlled hydrogen generator of the present invention include a reaction chamber for containing the hydrogen-containing composition to be mixed with water, a fluid separation device that prevents entrained liquid from exiting the reaction chamber with the generated hydrogen, and a means for adding water or an aqueous solution to the hydride. The fluid separation device is preferably made of a material that resists wetting under extremely alkaline conditions to permit the hydrogen to escape. Liquid free hydrogen gas can be produced even from the alkaline borohydride solution by using an oleophobic barrier such as PREVENTS, manufactured by W. L. Gore & Associates, Inc., Newark, Del.

The hydrogen generator may further include a conduit, passage or other means to deliver the hydrogen to a fuel cell. In one preferred embodiment, the means for adding the water to the reactor can be removed after the water addition to reduce the weight of the generator while it is operating. The hydrogen-containing composition can be in any form including, for example, powders, granules, pellets and tablets. Pellets are a preferred form because they simplify handling when loading the generator.

The means for adding water or aqueous solution to the reaction chamber includes means that provide water from a pressurized water system, means that provide water from a gravity feed system and means that provide for pouring water into the reaction chamber. Pressurized water systems include, for example, pumps, syringes, and gas pressurized water systems. Gravity feed systems include bags, tanks or other vessels of water that are positioned above the reaction chamber.

In a passively controlled hydrogen generator, the total amount of water added is between 100% and about 400% of the stoichiometric amount required to produce a desired amount of hydrogen. Preferably, the amount of water added is between about 125% and about 250% of stoichiometric amount.

In a preferred embodiment, an antifoam agent is added to the water to make an aqueous solution that is added to the hydride, because the generation of hydrogen during the hydration reaction typically creates foaming. By adding an antifoam agent to the reactant water, the size and weight of the hydrogen generator can be minimized because less volume is required for disengagement of the gas from the liquid/solids. Polyglycol anti-foam agents offer efficient distribution in aqueous systems and are tolerant of the alkaline pH conditions found in hydrolyzing borohydride solutions. Other antifoam agents may include surfactants, glycols, polyols and other agents known to those having ordinary skill in the art.

Because the hydration reaction proceeds at a faster rate at lower pH, an acid may be added to the reaction chamber, for example by premixing acid into the reactant water. Acids suitable for use include, for example, mineral acids, carboxylic acids, sulfonic acids and phosphoric acids.

FIG. 1 is a schematic of a passively controlled hydrogen generator in accordance with the present invention that may be made as a lightweight, single-use, disposable device. The passively controlled hydrogen generator 10 includes a reaction chamber 11 containing pellets 14 of a hydrogen-containing composition. An external water source, shown as syringe 17, is threadedly (or otherwise detachably) attached to the reaction chamber 11 at a water inlet port 15. A check valve 16 prevents generated hydrogen from escaping through the water inlet port 15. A measured amount of water treated with an antifoam agent is injected into the reaction chamber 11 from the syringe 17. The syringe may then be removed so that it does not add to the weight or size of the hydrogen generator. When the aqueous solution contacts the pellets 14, the hydration reaction starts to generate hydrogen gas. The hydrogen gas exits the reaction chamber 11 through the hydrogen exit nozzle 12 after passing through a fluid separator 13 to remove entrained liquid from the hydrogen.

The present invention further provides embodiments of a hydrogen generator having active control of the hydrogen generation rate from a hydrogen-containing composition. In a hydrogen generator having active control, the rate of the addition of water or an aqueous solution controls the hydrogen generation rate. In one embodiment of an actively controlled hydrogen generator, the hydrogen generator comprises a reaction chamber for holding a hydrogen-containing composition comprising a hydride; and an aqueous solution reservoir comprising an outlet port in fluid communication with a reaction chamber inlet port. The hydrogen generator further comprises means for adjusting the flow rate of an aqueous solution from the reservoir into the reaction chamber to control the hydrogen gas generation rate.

The hydrogen-containing composition for an actively controlled hydrogen generator comprises a hydride selected from salt-like hydrides, covalent hydrides that act like a salt-like hydride, covalent hydrides that are blended with an excess amount of catalyst to ensure that the hydration reaction proceeds quickly and smoothly or combinations thereof. Preferred embodiments of a hydrogen generator having active control of the hydrogen generation rate include adding excess catalyst to the catalyst-hydride blend to ensure that the hydration reaction is not limited by the rate of diffusion of the hydrate to the catalyst. However, in some applications it may be desirable to lessen the reactivity of the hydrogen-containing composition by reducing the catalyst concentration of the composition while still controlling the overall hydrogen generation through the rate of water addition.

Typical catalyst concentrations in the mixture of the one or more hydrides and catalyst in the hydrogen-containing component of an actively controlled hydrogen generator range between about 1 wt % and about 25 wt %, preferably between about 5 wt % and about 20 wt %, and more preferably between about 6 wt % and about 12 wt %, with weight percent being based upon the active component or components of the catalyst. The shape and the materials of construction for an actively controlled hydrogen generator are similar to those of the passively controlled hydrogen generator as discussed above.

The hydrogen generator, whether actively or passively controlled, may include more than one reaction chamber and/or more than one water chamber for some applications. Each reaction chamber comprises an inlet port for admission of water or an aqueous solution into the reaction chamber and an outlet port for the release of the generated hydrogen gas. The inlet port and the outlet port may each further include a fluid control device selected from, for example, a check valve, a ball valve, a globe valve, a needle valve or combinations thereof. Each of these valves may be manually operated or automatically operated as, for example, a solenoid valve, a pneumatically actuated valve, or an electrically actuated valve by means other than a solenoid. These valves may operate to limit the flow of a fluid through the ports to a single direction, to control or release pressure in the reaction chamber or to admit or vent fluids to/from the reaction chamber. A controller, including a computer, microchip-based controller or other device known to those having ordinary skill in the art, may actuate one or more of these fluid control devices to control pressures, levels, flows and temperatures to a setpoint or to move one of these fluid control devices to a predetermined open or closed position according to an operating program.

In an actively controlled hydrogen generator of the present invention, it is useful to initially wet the pellets at a high flow rate of the aqueous solution. If the pellets of catalyst-hydride blend are initially wetted at a high initial flow rate of 1.5 to 4 times the normal rate, the overall duration of the hydrolysis reaction is prolonged. This initial wetting period may extend for at least 30 minutes and preferably, between about 5 minutes and about 20 minutes.

In one embodiment of an actively controlled hydrogen generator, the means for adjusting a flow rate of an aqueous solution to the hydride includes an electrolyzer for generating hydrogen to pressure the water or aqueous solution from a reservoir. The reservoir may be, for example, an inflatable bladder, a chamber having a plunger disposed therein, or a chamber that may be pressurized. As is well known by those having ordinary skill in the art, an electrolyzer is an electrochemical cell having an anode and a cathode that are separated by a proton exchange membrane and having a power source that provides a current through the cell. The electrolyzer produces hydrogen and oxygen from a water feed according to the reaction shown in Equation 13:

$$2 H_2O \xrightarrow{\text{electricity}} 2 H_2 + O_2 \quad (13)$$

An electrolyzer can generate enough hydrogen to force the reactant water out of the reservoir and into the reaction chamber by, for example, applying pressure to the water chamber. Water may be supplied to the electrolyzer from the water chamber or from an alternative source. Water may be supplied to the electrolyzer from, for example, a water capsule within the electrolyzer or through conduits from the water chamber or from an alternative source. The power source may be, for example, a fuel cell that is operated from hydrogen produced by the hydrogen generator or one or more batteries.

In one embodiment of the present invention, the water chamber contains an inflatable bladder reservoir with water both inside and outside of the bladder. The reactant water inside the bladder supplies the reaction chamber with reactant water for the hydrolysis reaction and the electrolyzer water outside the bladder supplies electrolyzer water to feed a small electrolyzer mounted in the shell of the water chamber. The cathode of the electrolyzer faces the water chamber and produces the hydrogen used to pressurize the water chamber. The electrolyzer water from the water chamber diffuses through the proton exchange membrane to the anode side of the electrolyzer provide the water to the anode side as necessary to produce hydrogen and oxygen as shown in Equation 13. The oxygen produced at the anode is vented to the atmosphere. A controller can increase the current flowing through the electrolytic cell to increase the rate of hydrogen vented to the water chamber, thereby increasing the flow rate of the reactant water from the bladder as the water chamber pressure increases. Preferably, the electrolyzer cathode is exposed through the floor of the water chamber to maintain fluid communication with the electrolyzer water.

Hydrogen and/or oxygen gases generated by an electrolyzer can be vented to the water chamber, thereby increasing the pressure in the water chamber. The pressure increase in the water chamber caused by the delivery of the gas generated by the electrolyzer applies an increasing pressure to the outside of the inflatable bladder in proportion to the volume of the delivered gas from the electrolyzer. Applying the increased pressure to the bladder forces the reactant water from the bladder and into the reaction chamber. By increasing the current to the electrolyzer, hydrogen and oxygen are produced at a higher rate by the electrolyzer, thereby forcing reactant water from the bladder and into the reaction chamber at a higher rate. In some embodiments, as disclosed above, the oxygen produced by the electrolyzer is vented to the atmosphere. In some embodiments, the electrolysis gases pressurize the water chamber and force reactant water from the water chamber into the reaction chamber without an inflatable bladder. Alternatively, a plunger may be disposed within the water chamber instead of an inflatable bladder and gases produced by an electrolyzer or from alternative sources may pressurize a gas side of the plunger to push reactant water from the water chamber into the reaction chamber.

Electrolyzing a small amount of liquid water produces a relatively large volume of hydrogen gas. Each millimole of electrolyzer water (18 mg) generates 24.5 mL of hydrogen gas. Allowing for a slight over pressure to deliver the water, this volume of hydrogen is sufficient to deliver about 20 mL of reactant water to the reaction chamber. This amount of water or aqueous solution delivered to the hydrogen-containing composition in the reaction chamber can react with, for example, a borohydride salt (such as $NaBH_4$) to generate up to 12 L of hydrogen. Since the rate of electrolyzing the electrolyzer water is controlled by the current flowing to the electrolyzer, controlling the current to the electrolyzer controls the rate of reactant water injection into the reaction chamber, thereby actively controlling the rate of hydrogen generation.

In another embodiment of an actively controlled hydrogen generator, the means for adjusting a flow rate of an aqueous solution to the reaction chamber includes an electrolyzer mounted in the wall of the inflatable bladder that contains the water or an aqueous solution for injection into the reaction chamber. In this embodiment, by moving the electrolyzer from the shell of the generator to the wall of the bladder and by sealing the water chamber that contains the inflatable bladder, the need for a separate water supply for the electrolyzer is eliminated and both the hydrogen and the oxygen that is generated by the electrolyzer can be used to force water from the bladder into the reaction chamber.

Another means for adjusting a flow rate of an aqueous solution to the reaction chamber in accordance with the present invention includes the use of a hydrogen fed electrochemical pump that pumps water from the water chamber into the reaction chamber. Electrochemical oxygen and hydrogen pumps are well known to those having ordinary skill in the art and are described in several United States patents, including U.S. Pat. Nos. 5,938,640, 4,902,278, 4,886,514, and 4,522,698, which are hereby fully incorporated by reference. The electrochemically driven fluid dispensers disclosed in these patents have an electrochemical cell in which porous gas diffusion electrodes are joined respectively to the opposite surfaces of an ion exchange membrane containing water and functioning as an electrolyte. The electrochemically driven fluid dispenser uses a phenomenon such that when hydrogen is supplied to an anode of the electrochemical cell and a DC current is imposed between the anode and the cathode, the hydrogen becomes hydrogen ions at the anode. When the produced hydrogen ions reach the cathode through the ion exchange membrane, an electrochemical reaction arises to generate gaseous hydrogen. Since the net effect of these processes is transport of hydrogen from one side of the membrane to the other, this cell is also called hydrogen pump. The hydrogen generated and pressurized at the cathode is used as a driving source for pushing a piston, a diaphragm, or the like. The power savings produced by the lower operating potential of a hydrogen pump, ~0.1 V, compared to an electrolyzer, ~1.6-1.8 V, is significant. Preferably, an alternating current drives the hydrogen pump with the frequency determining the liquid flow rate.

In one preferred embodiment of the present invention, the hydrogen produced by the hydrogen generator is saturated with water and feeds a fuel cell. The fuel cell also produces water as a product of the reaction of hydrogen and oxygen. This water flows out of the fuel cell with the air from the cathode and the excess (unconsumed) hydrogen from the anode. The water from both of these water sources can be recovered as condensate and stored in a water reservoir until needed for the hydration reaction of the metal hydride in the hydrogen generator. This recovered water may be pumped into the reaction chamber by a hydrogen electrochemical liquid pump. An electrochemical pump can consistently provide accurate pumping of water at micro-flow rates without the need for a bladder and at significantly lower power than the electrolyzer.

In both the passively controlled and the actively controlled hydrogen generator, while the pelletized form of the hydride or catalyst-hydride blend is preferred, it is not required. The pelletized form is typically easier to handle but powdered forms and granular forms have also been tested and found to be effective.

One limitation of a metal hydride hydrogen generator is that if the hydration reaction is stopped by depriving the reactor of water, the reaction does not instantly stop but instead, slows to a stop as the water in the reactor is consumed, thereby allowing the formation of a salt crust on the surface of the hydride. Restarting the reactor requires either that the salt crust be mechanically broken up or that sufficient water be supplied to at least partially dissolve it. It has sometimes been possible to restart a hydrogen generator with a smaller excess of water, but this is generally a slow process.

However, in the presence of a ruthenium catalyst, an aqueous solution of ethylene glycol promptly and vigorously reacts and dissolves the crust, such as a sodium borate crust formed on the surface of a partially reacted sodium borohydride mass when it is starved of water or aqueous solution. When the ethylene glycol solution is introduced to a partially reacted metal hydride mass, the crust is quickly broken down and the reaction renewed with the copious generation of hydrogen from the decomposition of the borohydride.

In another embodiment of the present invention, a pressure resistant shell used on the hydrogen generator permits the head space of the generator to serve as a storage volume for hydrogen, making it in effect a chemical capacitor. When the generator is turned down and the hydrogen delivery doesn't drop as fast as the demand, excess gas is stored in the head space. When demand increases faster than the generator can ramp up, this gas supplies the demand. Operating the system so that the head space is always pressurized with stored hydrogen ensures that hydrogen is available as required to respond to spikes in power demand. A means for over-pressure release, such as a pressure safety valve or rupture disk, is required for any pressure vessel and some or all of the hydrogen contained within the reactor chamber may be vented through the release means if necessary to avoid rupturing the generator.

Figure 2:
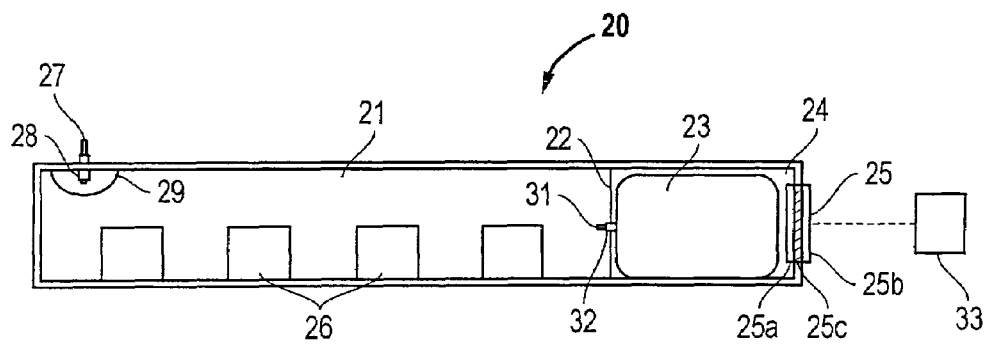
FIG. 2 is a cross-sectional view of an actively controlled hydrogen generator.

FIG. 2 is a cross-sectional view of an actively controlled hydrogen generator. The hydrogen generator 20 includes a reaction chamber 21 containing pellets 26 of a hydrogen-containing composition. A barrier 22 separates a water chamber 24 from the reaction chamber 21. The water chamber 24 contains an inflatable bladder 23 that is filled with reactant water or an aqueous reactant solution containing an antifoam agent and/or optionally, an acid. The reactant water that is contained within the bladder 23 can be pressured into the reaction chamber 21 through the inlet nozzle 32. A check valve 31 mounted on the inlet nozzle 32 prevents the contents of the reaction chamber 21 from flowing into the bladder 23.

The water chamber 24 further contains electrolyzer water that surrounds the bladder 23 and that is fed to the electrolyzer 25 mounted in the shell of the hydrogen generator 20 with the cathode 25a of the electrolyzer 25 in fluid communication with the water chamber 24. The electrolyzer water from the water chamber 24 is converted into hydrogen and oxygen by the electrolyzer 25. The oxygen is vented from the anode 25b of the electrolyzer 25 and the hydrogen produced at the cathode 25a pressurizes the water chamber 24, exerting pressure on the outer surface of the bladder 23 and causing reaction water to be pressured from the bladder 23 into the reaction chamber 21. The electrolyzer water required for electrolysis at the anode 25b diffuses through the proton exchange membrane 25c from the water chamber 24. The greater the rate of hydrogen production from the electrolyzer 25, the greater will be the rate of pressure increase in the water chamber 24 and therefore, the rate of water pressured into the reaction chamber 21 from the bladder 23. A controller 33 controls the amount of current from the power source (not shown) to the electrolyzer 25 to control the rate of hydrogen generation from the electrolyzer 25 and ultimately, controls the rate of hydrogen generation from the hydrogen generator 20. The power source may be a fuel cell, such as one operating from the hydrogen produced by the hydrogen generator 20, or one or more batteries.

Hydrogen generated from the hydrolysis reaction of the reaction water from the bladder 23 contacting the pellets 26 of the hydrogen-containing composition passes through a fluid separator 29 to remove any entrained water and then passes out the hydrogen outlet 27. A check valve 28 on the hydrogen outlet 27 prevents contents of a fuel cell (not pictured) from back-flowing into the hydrogen generator 20.

Figure 3:
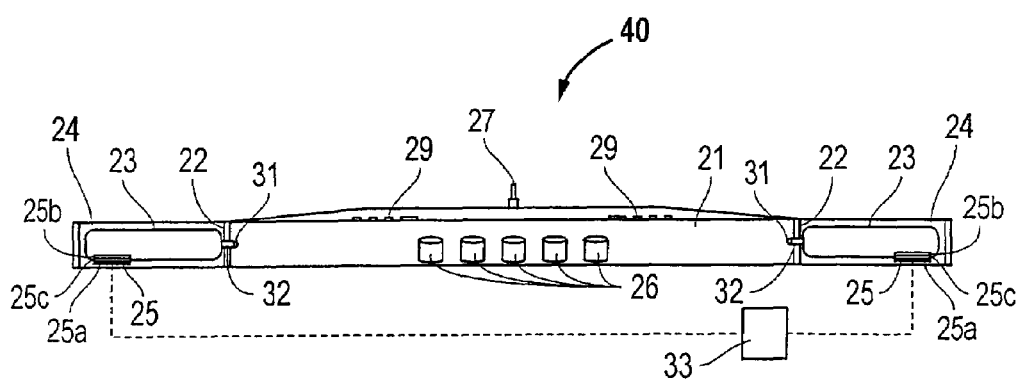
FIG. 3 is a cross-sectional view of an actively controlled hydrogen generator having an electrolyzer mounted on a bladder.

FIG. 3 is a cross-sectional view of an actively controlled hydrogen generator having an electrolyzer mounted on a bladder. In this embodiment, a hydrogen generator 40 includes two water chambers 24 with each water chamber holding an inflatable bladder 23 filled with reactant water. The water chambers 24 are separated from the reaction chamber 21 with barriers 22. In this embodiment, an electrolyzer 25 is mounted on the each of the bladders 23. As current is increased from the power supply (not shown) by the controller 33, the electrolyzers 25 increase the amount of hydrogen and oxygen that they produce and pressurize both the sealed water chambers 24 and the interior of the bladders 23. As the pressures in the water chambers 24 and the bladders 23 increase, the water flowing from the bladders 23 into the reaction chamber 21 also increases. The oxygen produced at the anode 25b vents to the water chambers 24 and the hydrogen produced at the cathode 25a vents to the interior of the bladder 23.

The pellets 26 of the hydrogen-containing composition begin to hydrolyze and generate hydrogen upon contact with the water. The hydrogen passes through the fluid separators 29 to remove any entrained water and the hydrogen may then be delivered to a fuel cell (not shown). The fluid separators 29 may be, for example, GORE PREVENTS™ barriers mounted on a sheet of polyetherimide or polyethylene as described in Example 15.

Figure 4:
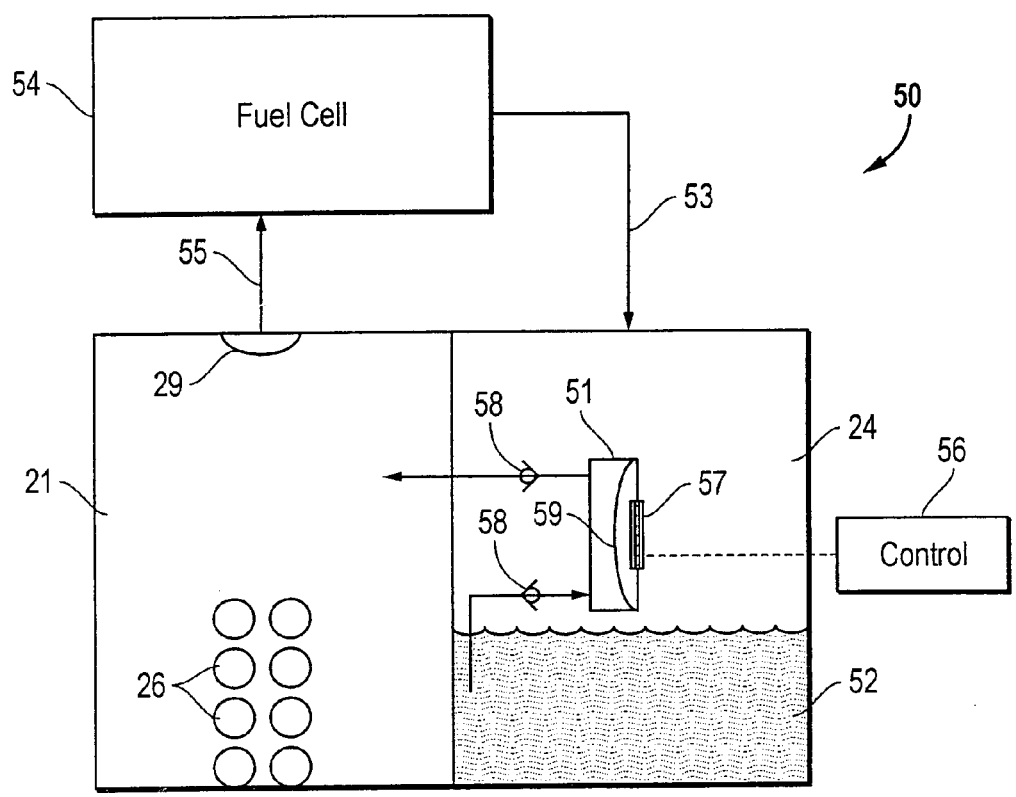
FIG. 4 is a schematic drawing of a hydrogen generator utilizing a hydrogen-fed electrochemical liquid pump.

FIG. 4 is a schematic drawing of a hydrogen generator 50 utilizing a hydrogen-fed electrochemical liquid pump 51 in accordance with the present invention. In this embodiment, water or an aqueous solution 52 is held within the water chamber 24 and the reaction chamber 21 holds pellets 26 of the hydrogen-containing composition comprising hydride or a catalyst-hydride blend. Hydrogen produced from the hydrolysis reaction in the reaction chamber 21 passes to the fuel cell 54 as fuel. The hydrogen stream 55 leaving the reaction chamber 21 is saturated with water. The fuel cell 54 generates electricity from the fuel supplied and also produces water at the anode (not shown). Excess hydrogen, the water produced at the anode, and the water that saturated the hydrogen stream 55 exit the fuel cell in an excess hydrogen/water return line 53. The excess hydrogen/water return line 53 delivers the water and hydrogen to the water chamber 24. A hydrogen-fed electrochemical liquid pump 51 pumps the water from the water chamber 24 to the reaction chamber 21 as necessary for hydrogen production through the hydrolysis of the pellets 26. Check valves 58 prevent reverse flow through the pump 51. A controller 56 controls the rate of pumping by the pump 51 and thereby controls the rate of hydrogen generation from the generator 50.

The electrochemical pump 51 comprises an elastic diaphragm 59 and a membrane and electrode assembly (MEA) 57 comprising a proton exchange membrane disposed between two platinum catalyst gas diffusion electrodes as known to those having ordinary skill in the art. Hydrogen from the head space of the water chamber 24 is driven across the MEA 57 in alternating directions as the polarity is reversed across the MEA 57. The hydrogen movement causes the elastic diaphragm 59 to move in a pumping motion. The controller 56 adjusts both the current and the frequency of polarity reversals across the MEA 57 to drive the electrochemical pump 51. The power source for the controlled current to the pump 51 is preferably the fuel cell 54.

Figure 5A:
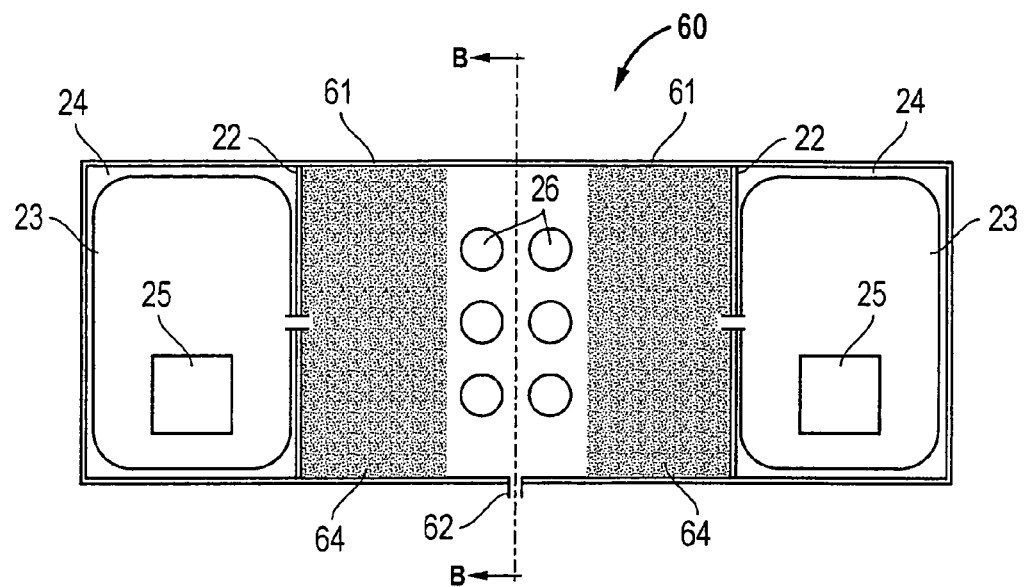
FIGS. 5A-B are drawings of a bottom view and a cross-sectional view of a hydrogen generator.
Figure 5B:
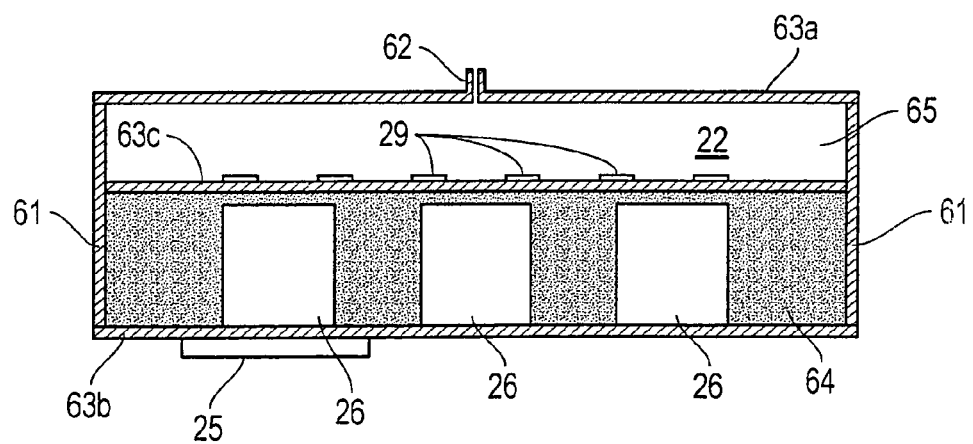

FIGS. 5A-B are drawings of a bottom view and a cross-sectional view of an embodiment of a lightweight hydrogen generator. The cross-section view has been rotated to show the top of the hydrogen generator at the top of the drawing for ease of viewing. In this embodiment of a hydrogen generator 60, a balsa wood frame 61 supports a covering of polyetherimide (PEI) sheets 63 (FIG. 5B) forming the top 63a and bottom 63b of the hydrogen generator 60. Electrolyzers 25 are attached to the PEI sheet forming the bottom 63b and are in fluid communication with the water chambers 24 in the same manner as shown in FIG. 2. Lightweight foam 64 with a large open volume fraction is shown as an option and serves to prevent the pellets 26 from shifting prior to use. Fluid separators 29, such as GORE PREVENTS, are attached to a PEI sheet 63c to provide separation of entrained liquids from the hydrogen gas product. The hydrogen gas exits through the hydrogen exit 62.

Figure 6:
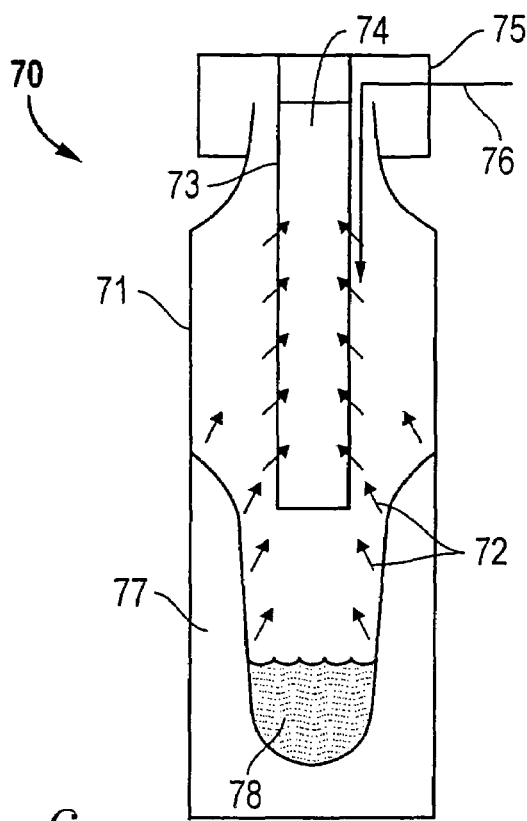
FIG. 6 is a cross-sectional view of a containment system for a hydrogen generator.

FIG. 6 is a cross-sectional view of a containment system for a hydrogen generator in accordance with the present invention. The containment system 70 provides separation of the catalyst-hydride/hydrolysis products 77, generated hydrogen 72, and water 78 from the ambient surroundings. The container may take any shape and be made of any materials including, but not limited to, alkaline resistant polymer, metal, carbon, graphite, or combinations thereof. At least one water inlet 76 and at least one hydrogen outlet 74 are provided. Ancillary components of the system for removal of hydrogen and introduction of water can be attached to the openings 74, 76 utilizing attachment mechanisms such as threaded ports, crimping, welding, gluing, interference fit, or snapping mechanisms. The containment system 70 further includes a liquid-gas separator 73 that provides separation of the generated hydrogen 72 from the remaining hydrolysis product 77. The separator 73 may take any shape and be made of, for example, expanded PTFE, other polymers with nanometer scale pores, or materials that readily diffuse hydrogen such as silicone or palladium.

EXAMPLE 1

Hydride Pellet Production

The hydride is frequently prepared as pellets. For each compound to be tested in this form, pellets were produced both neat and with predetermined amounts of catalyst blended with the hydride. For catalyzed pellets, the catalyst was blended with the hydride by grinding the components together. Pellets were standardized with a diameter of 13 mm and a height of ~1 cm. The exact height of a pellet varied, as variations in additives and pressing conditions altered the final density. The pellets were produced using a standard pellet die (Graseby Specac) with a 12 ton press (Carver).

The effect on the density of lithium hydride pellets caused by varying the pressure exerted by the press is shown in Table 3. The accuracy of the pressures shown is about ±500 psi.

TABLE 3

| Pressure (psi) | Density (g/mL) | Fraction of Theoretical |
|---|---|---|
| 5,000 | 0.530 | 68.0% |
| 10,000 | 0.551 | 70.7% |
| 15,000 | 0.577 | 74.0% |
| 20,000 | 0.609 | 78.1% |
| 25,000 | 0.649 | 83.3% |
| 30,000 | 0.659 | 84.5% |

All of the pellets showed good integrity and were easily handled after removal from the die. The results show that the density of the pellets varied smoothly with the applied pressure over the range examined.

EXAMPLE 2

Evaluation of Hydrogen Evolution from Hydride Pellets

Figure 7:
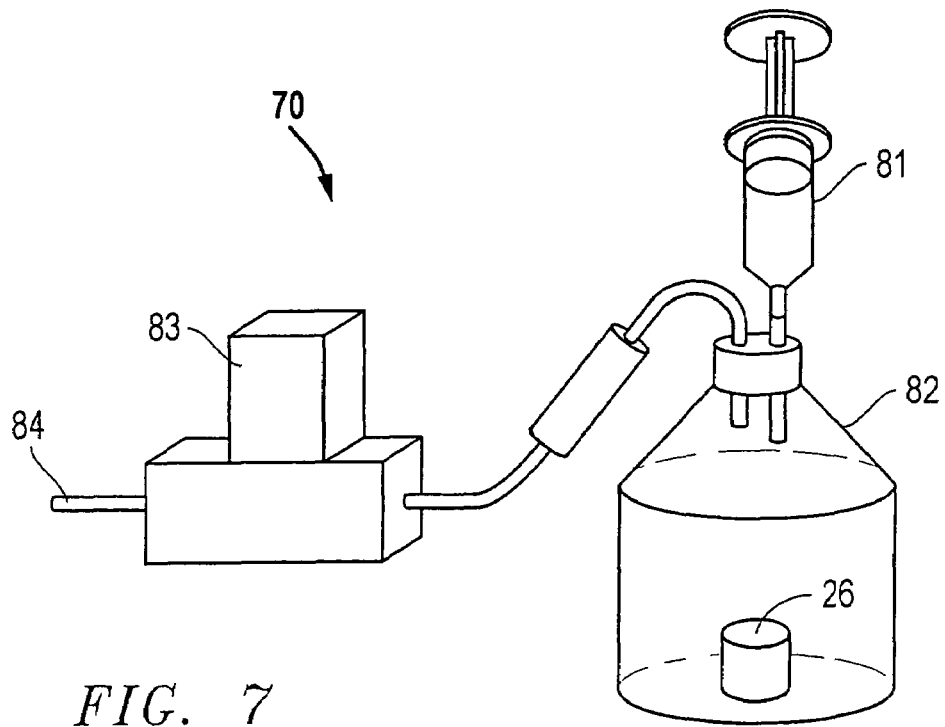
FIG. 7 is a schematic of an apparatus for quantitatively measuring the rate of hydrolysis of catalyzed hydride compositions.

An apparatus for evaluating both neat and hydride-catalyst compositions for use in passively controlled generators is shown in FIG. 7. The hydride is shown as a pellet 26, which is a preferred form for the hydride because it is easily handled. A measured amount of water was injected into the flask 82 at the start of the experiment. Typically two to five grams of hydride were used in each reaction. The amount of water added was determined by the amount of hydride, the amount of water required to stoichiometrically hydrolyze it, and the stoichiometry being tested. As hydrogen was generated, the gas stream exited the flask 82, passed through a drying tube 85, and exited through a mass flow monitor 83 and vent 84. The drying tube 85 removed most, if not all, of the water in the gas stream. It is important that the dew point of the gas passing through the mass flow 83 is significantly below ambient to avoid condensate in the instrument, which could substantially reduce the accuracy of the measurements. The rate of gas generation was monitored as a function of time and integrated to determine the total volume of gas generated.

Baseline, or uncatalyzed, pellets were hydrolyzed and the results examined. All of the initial tests were carried out using twice the amount of water required to stoichiometrically hydrolyze the hydride to a hydroxide. The uncatalyzed NaBH$_4$ pellets showed an initial burst of hydrogen when water was added. This burst was $\leq$250 mL/min and never lasted more than a few seconds. After the initial burst of activity, the hydrolysis rate dropped rapidly to below the threshold for measurement and remained there until the experiments were terminated. The appearance of these pellets changed little over the course of the experiment, remaining as white cylindrical pellets resting in a pool of the solution formed by the initial reaction. A drop in rate was expected because the BH$_4^-$ ion is stable in basic solution, and the sodium borate formed by the hydrolysis reaction is basic.

LiH pellets showed an initial burst of hydrogen following the addition of water. After the initial burst, the rate of hydrogen generation rapidly dropped. Within a minute or two the rate had fallen to below the 10 mL/min that represents the lowest flow that could be reliably measured by the equipment. Short bursts of hydrogen generation occurred intermittently and were correlated with cracks appearing in the pellet. The experiment was terminated after about an hour. In all cases, the pellet was only partially consumed (sodium borohydride partially reacted) when the experiment terminated and free water remained. The amount of force used to fabricate the pellets had no apparent effect on their hydrolysis. Pellets compacted with a load of about 6,000 pounds showed essentially the same hydrogen evolution pattern as pellets compacted at 1,000 pounds.

EXAMPLE 3

Hydride Pellets with Wicking Agents

LiH pellets were separately formed with four different wicking agents that included two sources of cellulose fibers, (paper and cotton), modified polyester having a surface treatment to enhance water transport along the surface without absorption into the fiber, and polyacrylamide, the active component of disposable diapers. In each case, the wicking material was included with the LiH in the die for pressing.

The pellets were hydrolyzed as described in Example 2. The fiber-containing pellets hydrolyzed quantitatively, unlike the results of Example 2. However, the reaction was quite rapid, lasting no more than a few minutes in any of the cases. The rate of hydrogen generation peaked in excess of 1.5 L per minute and then decreased to about 100 mL per minute within 5 minutes. The entire reaction was over in about 45 minutes.

In the presence of a ground paper wick or a polyacrylamide wick mixed into the hydrogen-containing composition at 1.1 to 11.1 wt %, the reaction time was reduced to about 20 minutes with a quantitative evolution of gas. The rate of hydrolysis of LiH pellets was not influenced by the quantity of wick present.

EXAMPLE 4

Catalyzed Hydride Pellets

Using the same apparatus as described in Example 2, hydrolysis of catalyzed pellets containing RuCl$_3$ followed a substantially different course than the uncatalyzed pellets. The same ratio of water to hydride (twice stoichiometric) was used. It was added to the chamber containing a catalyzed pellet in a single addition and the same small initial puff of hydrogen gas was observed. Following an initial decline, the rate of hydrogen generation gradually began to climb. Unlike the uncatalyzed pellets, these pellets quickly dissolved in the water to produce a clear solution that effervesced with hydrogen. The climb in the rate of hydrogen production continued for 20 to 35 minutes after which the rate of gas generation accelerated rapidly. This rapid rise was followed by a similarly rapid fall. For the pellets with 1 wt % RuCl$_3$, the area under the curve corresponded to 100% of the calculated amount of hydrogen expected, i.e., quantitative hydrolysis of the hydride. This demonstrated the effectiveness of Ru as a catalyst for the hydrolysis of BH$_4^-$.

EXAMPLE 5

Hydride Pellets Containing Resin-supported Catalyst

Pellets were also produced using Ru on ion exchange resin as the catalyst. Dowex 50W was converted from the acid form to the ruthenium form by equilibration with an aqueous solution of RuCl$_3$ and dried. After drying, the resin was ground and mixed with NaBH$_4$. When water was added to the flask of the apparatus as described in Example 2, the rate of hydrogen generation rapidly exceeded the 1 L/min maximum rate of the mass flow monitor. Adding the water slowly demonstrated that the hydrolysis was quantitative. Based upon the manufacturers' ion exchange capacity, a pellet made with 5 wt % of the fully loaded ion exchange resin is 0.625 wt % Ru. This compares to loadings of 1 wt % Ru for the reduced Ru catalysts and about 0.6 wt % Ru for RuCl$_3$. The activity of the resin-supported catalyst was moderated by reducing the amount of catalyst used. Pellets with 1 wt % Ru on resin produced hydrogen at a significantly reduced rate, while still achieving quantitative hydrolysis.

EXAMPLE 6

Reduced Ruthenium as Active Species

The active Ru species was identified by producing and hydrolyzing a series of pellets produced with different forms of ruthenium, including ruthenium chloride and three forms of reduced Ru: Ru black, 20 wt % Ru on a carbon support, and 40 wt % Ru on a carbon support. These pellets were tested using the apparatus described in Example 2. All four were effective for the quantitative hydrolysis of BH$_4^-$ but only the three reduced ruthenium catalysts produced an immediate and steady hydrolysis on addition of water. By contrast, testing the pellets having RuCl$_3$ catalyst resulted in a delay of the hydrolysis reaction upon the addition of the water. These results indicate that the active species for the hydration of hydrides is reduced Ru. This conclusion also explains the results observed when using the RuCl$_3$ catalyst; the gradual formation and accumulation of Ru$^0$ produced by the reduction of the RuCl$_3$ led to an increase in the number of available reaction sites having the reduced ruthenium, thereby causing an increase in the reaction rate that continued until all of the BH$_4^-$ was consumed. In general, all of the reduced forms of Ru were observed to be quite active.

EXAMPLE 7

Nickel Chloride and Cobalt Chloride Catalysts

Given the effectiveness of RuCl$_3$, the equivalent chlorides were tested for nickel and cobalt as well. Anhydrous NiCl$_2$ and CoCl$_2$ were obtained and blended with sodium borohydride by grinding and then fabricated into pellets for hydrolysis as described in Example 1.

Using the apparatus described in Example 2, it was determined that $CoCl_2$ is an effective catalyst for hydrolyzing $BH_4^-$, but within a narrow useful range. Concentrations of 1.5 wt % and less produce a very slow hydrolysis reaction, while concentrations over 2 wt % produce a rapid, vigorous, quantitative hydrolysis.

Figure 8:
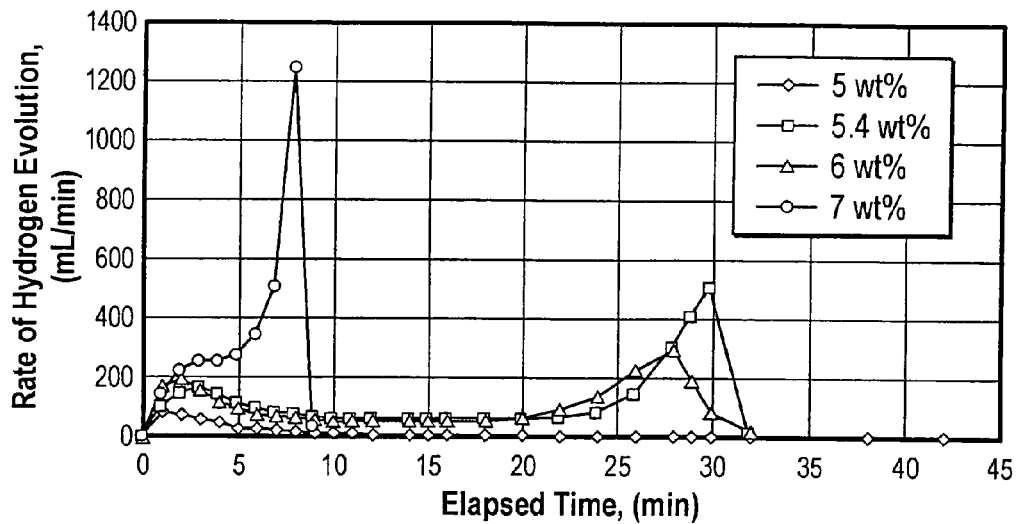
FIG. 8 is a graph of the rate of hydrogen evolution for $NiCl_2$ catalyzed $NaBH_4$ pellets as a function of catalyst content.

$NiCl_2$ appears to have a wider range of useful compositions, although more catalyst is required than when using $CoCl_2$ as shown in FIG. 8. At all compositions above 5 wt % the hydrogen evolution rate exhibits two maxima. The first maximum is the result of acid generation as the deliquescent anhydrous $NiCl_2$ is hydrolyzed as shown in Equation 14.

$$NiCl_2 + 2H_2O \rightarrow Ni(OH)_2 + 2HCl \tag{14}$$

The second maximum is the result of temperature effects as the temperature of the mixture increases and the reaction accelerates. It should be noted that when non-precious metal catalysts are used, the quantities of catalyst required are substantially greater than with precious metal catalysts. Using non-precious metals produces a small, but measurable reduction in the hydrogen yield as a function of reactant mass.

EXAMPLE 8

Ratios of Lithium and Sodium Borohydrides

Figure 9:
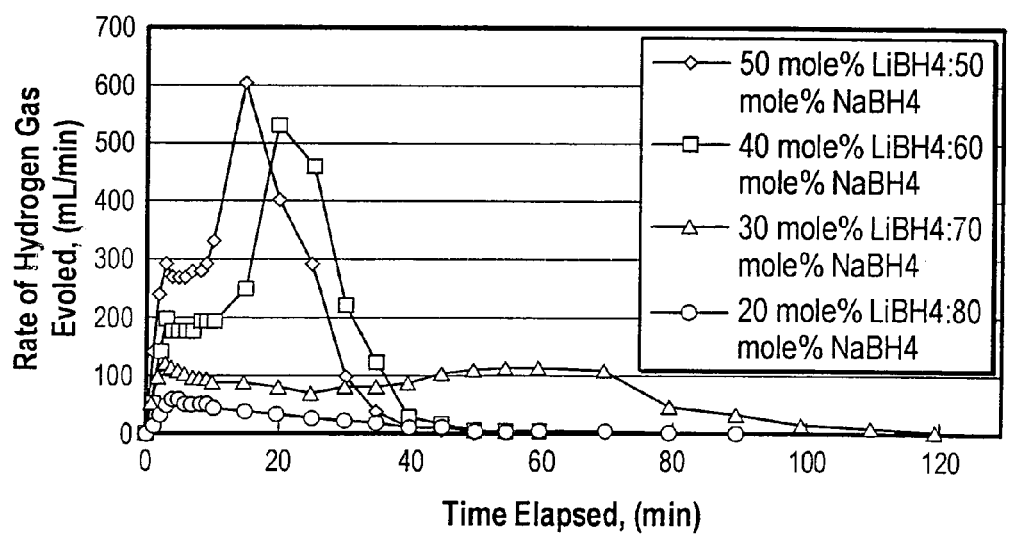
FIG. 9 is a graph indicating the hydrolysis rate of mixed lithium and sodium borohydride pellets (total salt=103.1 mmol) containing 2.60 wt % Ru on Alumina.

Using the apparatus described in Example 2, pellets having different mole ratios of $LiBH_4$ and $NaBH_4$ were hydrolyzed with a constant fraction of supported ruthenium as the catalyst. The results are shown in FIG. 9, with total borohydride salts of 103.1 mmol for each of the pellets. Greater than 30 mol % $LiBH_4$ appeared to be excessive for achieving a steady rate of generation of hydrogen gas when the catalyst was fixed at 2.60 wt %. From these results it's clear that a blend of 30 mol % $LiBH_4$ and 70 mol % $NaBH_4$ with 2.60 wt % supported Ru as a catalyst produces a smooth, steady, quantitative hydrolysis.

EXAMPLE 9

Catalyst Requirements at Varying Lithium Borohydride Fractions

Figure 10:
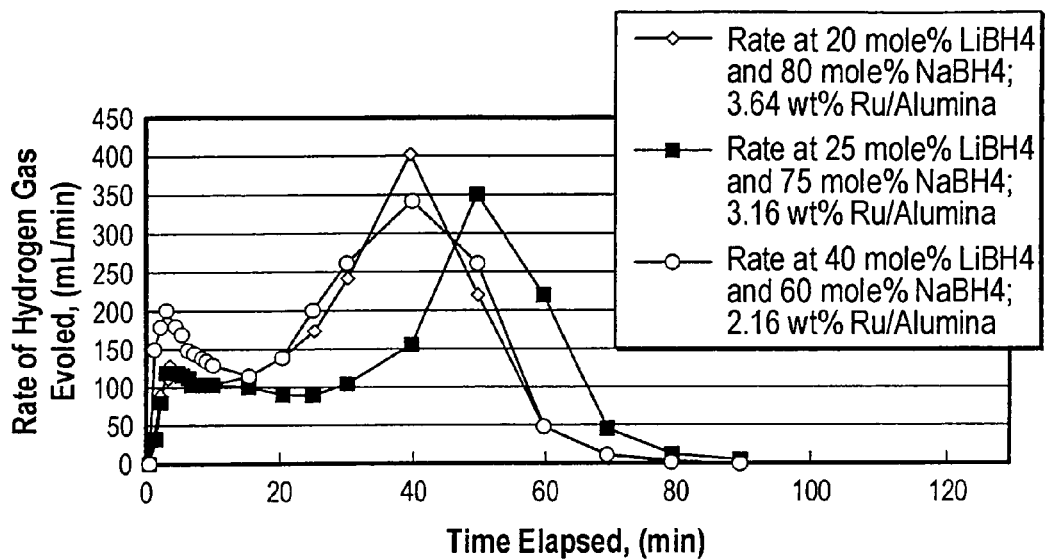
FIG. 10 is a graph indicating hydrolysis rates for mixtures of $LiBH_4$ and $NaBH_4$ pellets containing different concentrations of Ru on Alumina in ⅝ inch tube.

Different formulations of lithium and sodium borohydride salts were blended and pressed into pellets with a ruthenium catalyst supported on alumina at varying weight fractions. These pellets were then tested in the apparatus described in Example 2 with the results shown in FIG. 10. Each of the curves indicates that quantitative amounts of hydrogen gas can be obtained under these conditions. The three curves show that increasing the mole fraction of $LiBH_4$ in the mixture reduces the amount of catalyst required.

EXAMPLE 10

Antifoam Agents in the Hydrolysis Water

Polyglycol anti-foam agents offer efficient distribution in aqueous systems and tolerance of alkaline pH conditions that are found in hydrolyzing borohydride solutions. A sample of a polyglycol anti-foam agent was obtained from the Dow Chemical Company (Midland, Mich.). It was blended with the water used for hydrolysis and tested. Good foam control was obtained for the hydrolysis of the hydride when using 50 ppm of "Polyglycol".

"Antifoam BB" was obtained from RBP Chemicals (Midland, Mich.) as an organic defoaming surfactant, and was added to water at a 50 ppm concentration. The solution was used to hydrolyze mixed borohydride pellets having 25 mole % $LiBH_4$ and 75 mole % $NaBH_4$ blended with ruthenium supported on alumina at concentrations ranging from about 3.6 wt % to about 4.3 wt %. This agent tended to promote the rate of hydrogen gas evolution and it may contain organic wetting agents. Its foam control was poor.

Figure 11:
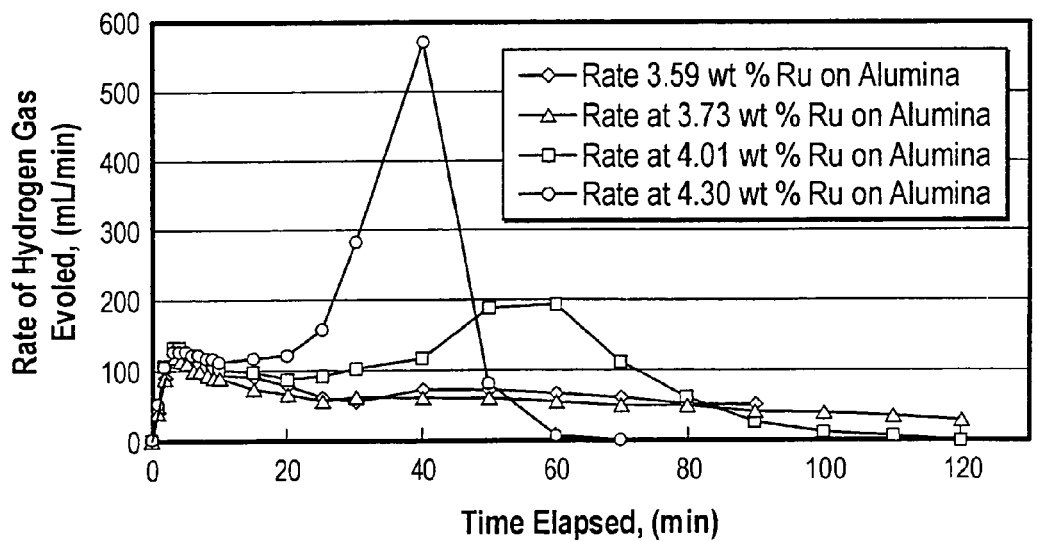
FIG. 11 is a graph indicating the influence of 50 ppm "C-2245" antifoam Agent (New London) on the hydrolysis of 25 mole % $LiBH_4$ and 75 mole % $NaBH_4$.

New London Chemicals (Midland, Mich.) produces a blended anti-foaming agent (C-2245) with good alkaline stability that is described as containing polyglycol and other organic compounds. The use of "C-2245", added to water at a 50 ppm concentration, produces a good stabilizing effect on foam production in reactors containing mixed lithium and sodium borohydride pellets, and provided satisfactory hydrogen evolution rates for the period of 60 minutes. FIG. 11 shows the influence of 50 ppm "C-2245" on the hydrolysis of pellets containing 25 mole % $LiBH_4$ and 75 mole % $NaBH_4$ when the wt % of Ru on Alumina is varied from 3.59 wt % to 4.30 wt % in catalyst. Excellent foam control was obtained for pellets containing 4.01 wt % Ru on Alumina and satisfactory foam control was obtained for 4.30 wt % catalyst.

EXAMPLE 11

Varying Catalyst Proportions in Blend

Figure 12:
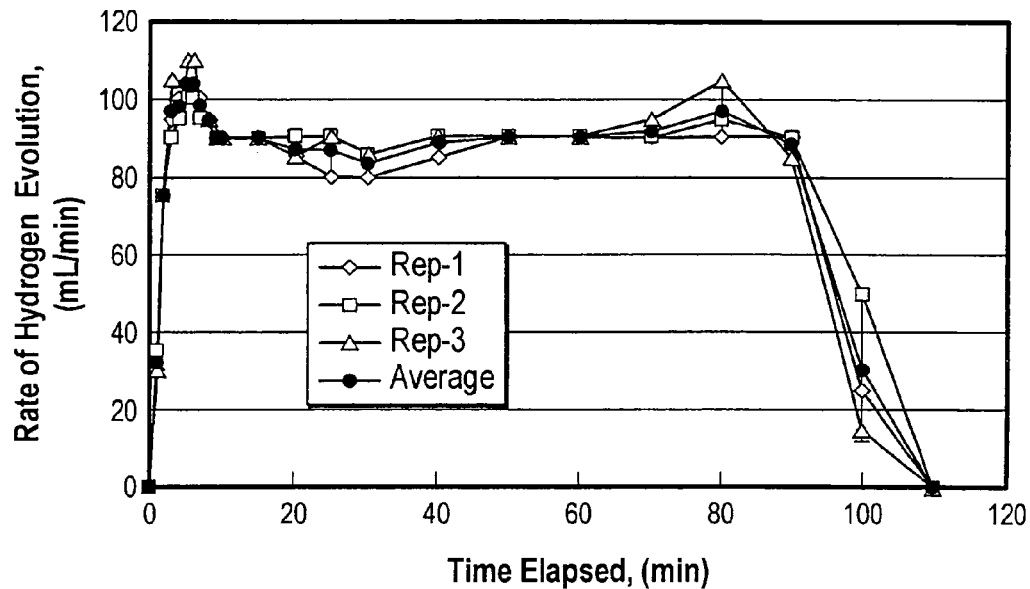
FIG. 12 is a graph indicating the reproducibility of hydrolysis rates obtained for 5.14 wt % Ru on Alumina in 82 mmol borohydride (2.839 g) present as 20 mole % $LiBH_4$ and 80 mole % $NaBH_4$.

Pellets having quantities of borohydride salt and proportions of catalyst were continuously changed in succession and tested the apparatus described in Example 2 until the combination of 82 mmol borohydride and 5.14 wt % Ru on Alumina was arrived at. FIG. 12 shows that the 5.14 wt % loading of catalyst in 82 mmol of borohydride salt can reliably produce suitable rates of hydrogen gas production, in excess of the 65 mL/min target set for these experiments, with an average standard deviation of 3.2 mL/min and with excellent reproducibility. The total reaction mass for each of these tests was 13.1 g, yielding a hydrogen generation of 6.0 wt %.

EXAMPLE 12

Catalyst Proportions

Figure 13:
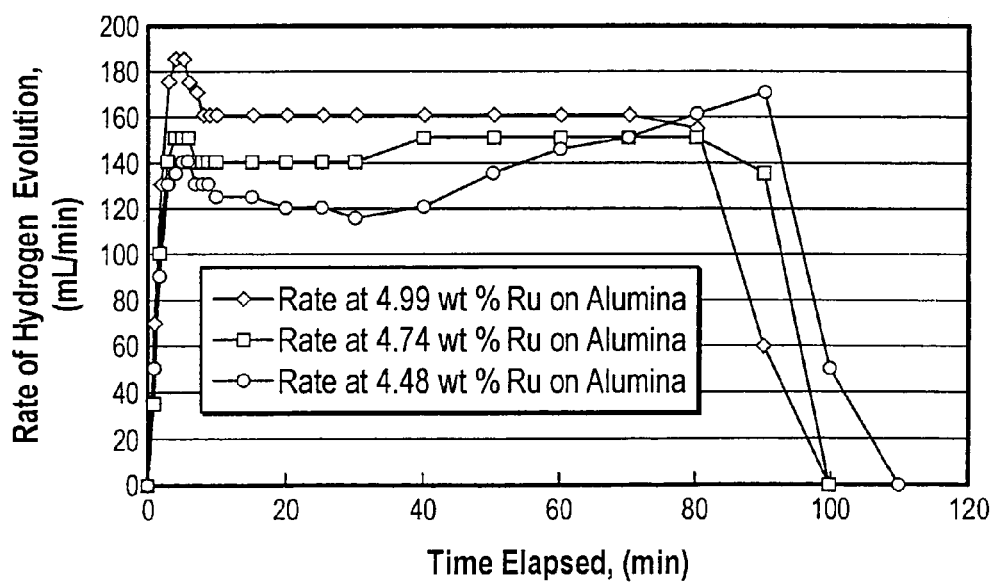
FIG. 13 is a graph indicating the variation in the rate of hydrogen evolution with catalyst content (Ru on Alumina) for 113.4 mmol borohydride (3.926 g) as 20 mole % $LiBH_4$ and 80 mole % $NaBH_4$.

Pellets were made and tested in the apparatus described in Example 2. The pellets were made up of about 113.4 mmol of mixed borohydride salts having 20 mole % $LiBH_4$ and 80 mole % $NaBH_4$. Ru on alumina catalyst was blended with the mixed borohydride salts before the pellets were formed. Each batch of pellets had a different level of ruthenium supported on the alumina, ranging from 4.99 wt % to 4.48 wt %. The water added to the flask in the testing apparatus was held constant at 10.1 g of water containing 50 ppm C-2245 antifoam. The best proportion of catalyst for this reactant mass was found to be 4.99 wt %, as shown in FIG. 13.

EXAMPLE 13

Hydrogen Production Rates with Active Control

Achieving a target delivery rate of 240 mL of hydrogen gas per minute for an hour (14.4 L/hr) requires 161 mmol of sodium borohydride storage material and 20.3 mL of aqueous antifoam solution. All of tested blends contained a sufficient amount of catalyst to insure a prompt reaction so that the rate of water addition determined the rate of hydrogen generation and not the rate of diffusion of the hydride to the catalyst. These compositions are, therefore, intended for use in an actively controlled hydrogen generator.

Figure 14:
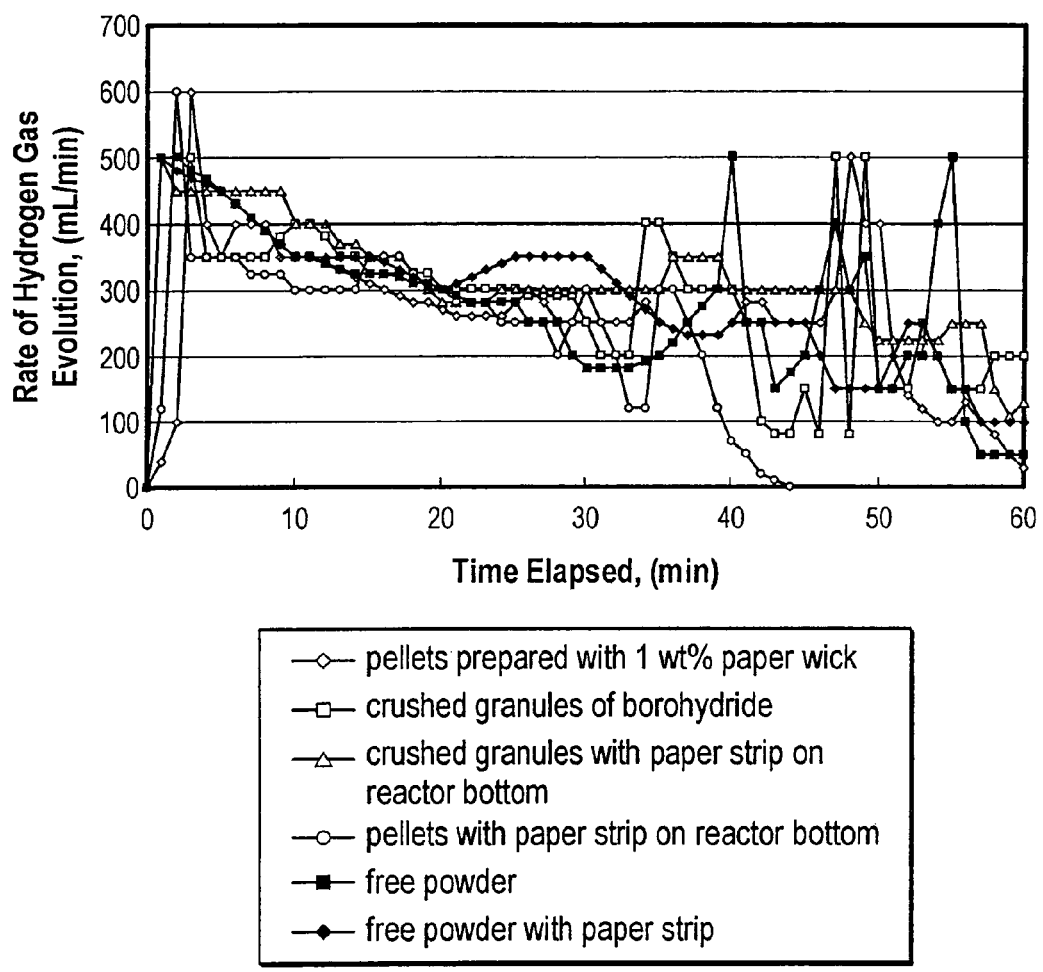
FIG. 14 is a graph indicating the hydrogen evolution rate with continuous drop-wise addition of 50 ppm C-2245 antifoam solution using a syringe pump (20.3 mL solution/hour) to deliver it to 161 mmol of sodium borohydride in the form of pellets, crushed granules, or free powder.

To determine the effect of the form of the hydride on the process several variations were tested: pellets, crushed granules, and free powder. The hydrogen evolution rate was controlled by using a syringe pump (20.3 mL solution/hour) to deliver the drop wise addition of water having 50 ppm C-2245 antifoam. Ruthenium chloride was present as catalyst at about 8.2 wt %. As shown in FIG. 14, a target rate of 240 mL $H_2$/minute can be maintained for about 50 minutes using most of these combinations but the rates tended to be erratic with a significant excess of hydrogen produced in the early stages of the reaction when water was poorly distributed in the developing alkaline foam and crust.

Furthermore, the observed rates indicated that the granulated and powder forms of solid borohydride performed better than the pellet forms owing to better transfer of water in the hydrolyzing solids. The inclusion of plain paper wicking laid out on the bottom of the floor of the tubular reactor smoothed the rates for the case of granules and fresh powder by increasing the distribution of water within the crust, but did not improve rates for the pellet forms.

EXAMPLE 14

Temperature Effects

Figure 15:
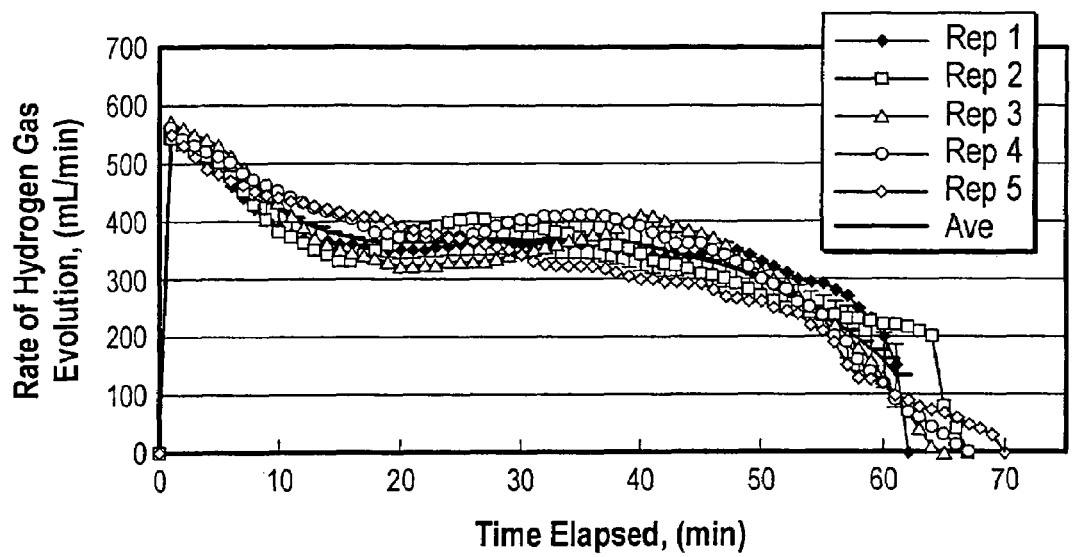
FIG. 15 is a graph indicating the reproducibility of five hydrolysis runs for 178 mmol sodium borohydride (6.733 g) with 8.17 wt % ruthenium chloride (550 mg) and for delivery of antifoam solution at 0.374 mL/min for 60 min at an ambient temperature of 21° C. and 5 wt % wicking material.

Satisfactory rates of hydrogen gas generation have been obtained for the hydrolysis of 178 mmol quantities of sodium borohydride powder when ruthenium chloride catalyst is present in excess and the rate of reaction is controlled by metering the reagent aqueous antifoam solution via a syringe pump for 60-63 minutes. Slight scatter is evident for runs obtained at 21° C. with an average standard deviation of 30.6 mL/min of hydrogen gas per minute as shown in FIG. 15. The five runs shown in FIG. 15 were run under conditions including 178 mmol of sodium borohydride with 8.17 wt % ruthenium chloride with delivery of the aqueous solution at 0.374 mL/min for 60 minutes at an ambient temperature of 21° C. and 5 wt % wicking material. The rates were steady and the average useful duration of hydrolysis reaction was 55 minutes.

Figure 16:
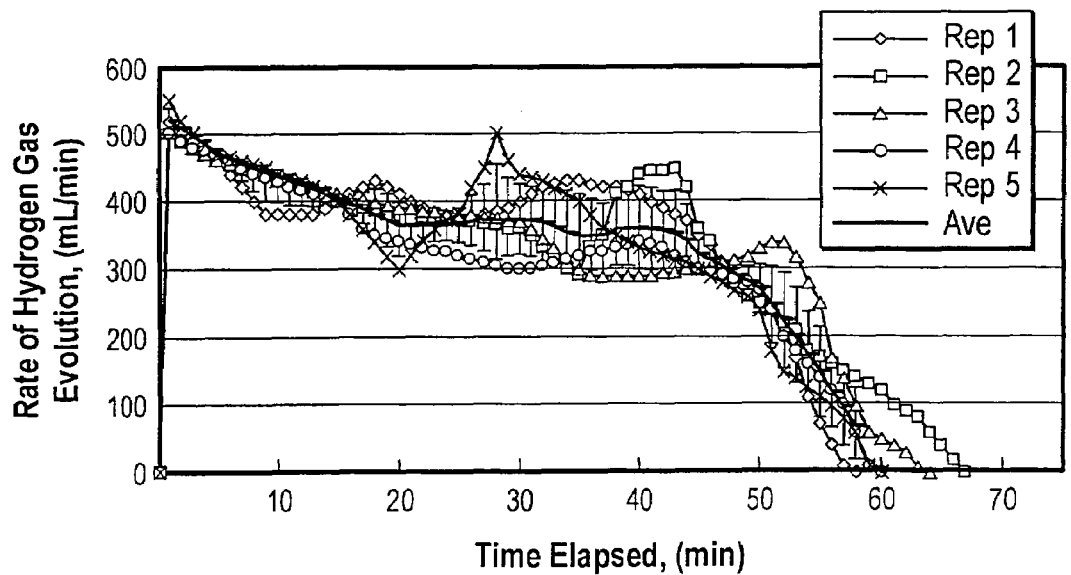
FIG. 16 is a graph indicating the reproducibility of five hydrolysis runs for 178 mmol sodium borohydride at 15° C.

The same tests were run at 15° C., holding all other variables constant, with the results shown in FIG. 16. Scatter is significant for the runs at 15° C. (average standard deviation=37.7 mL/min) because the wetting front was sometimes stalled in progressing along the length of the tube despite the presence of a wick.

EXAMPLE 15

A PEI Hydrogen Generator

A packet hydrogen generator comprising a flexible bag having a mass of 7.7 g, measuring about 3½ in.×6 in. and made of three sheets of polyetherimide (PEI) was constructed for testing. The sheets were bonded together with high temperature Bemis hot melt adhesive. Two GORE PRE-VENTS™ barriers were mounted on the middle PEI sheet with polypropylene backing or alternatively, with nickel foam backing. The inlet check valve and exit barb were mounted to the upper sheet. Fuel supplied to the hydrogen generator comprised a blend of 178 mmol of sodium borohydride (6.73 g) and 8.17 wt % ruthenium chloride catalyst formed into pellets. The pellets were inserted between the middle and lower PEI sheets and sealed either just prior to initiating the hydrolysis reaction, or at the time of fabrication of the bag. Water with antifoam additive was introduced via the centrally located check valve from an overhead position at a rate of 0.374 mL/min at 21° C.

Figure 17:
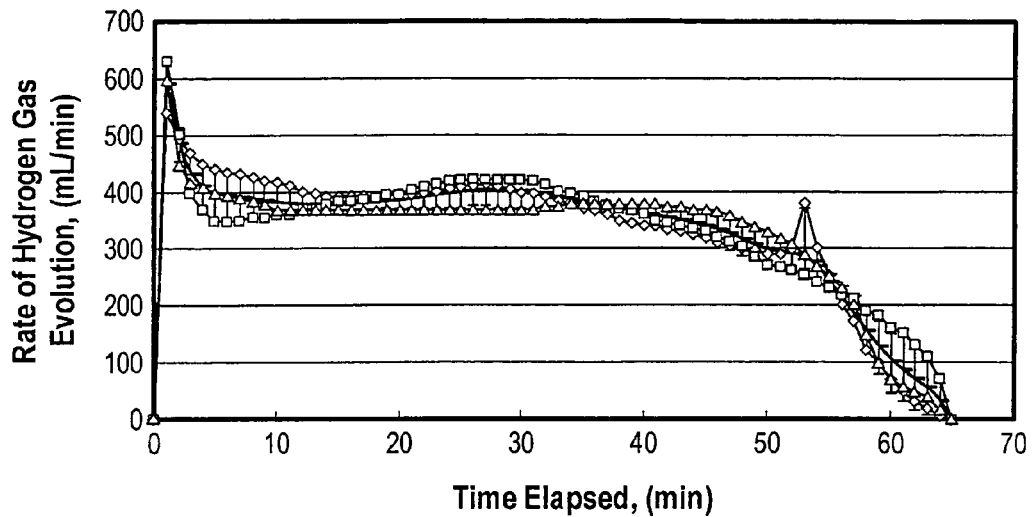
FIG. 17 is a graph indicating the reproducibility of hydrogen gas generation using a polyetherimide (PEI) packet generator.

FIG. 17 shows that the average standard deviation for three runs was 25.4 mL/min $H_2$ with the flow remaining well above the 240 mL/min target for over 50 minutes. The brief spike in the rate at the onset of the hydrolysis reaction is actually useful, as it insures that the fuel cell is rapidly purged of air or inert gas. Quantitative amounts of hydrogen gas are thereby obtained, especially when the pellets are clustered near the antifoam solution inlet valve.

EXAMPLE 16

Effect of Pre-Wetting the Pellets

The rate of hydrogen generation can be prolonged through reducing the rate of delivery for the aqueous hydrolysis solution after an initial reaction initiation period. These tests were conducted using the apparatus described in Example 2 modified by adding a syringe pump to inject water into the flask in a slow controlled manner so that the hydrogen generation rate was actively controlled by the rate of water addition. The pelletized fuel comprised 1.78 mmol sodium borohydride blended with 8.17 wt % ruthenium chloride.

For the hydrolysis reaction with pellets, preferably a preadsorption or wetting period is provided to ensure a steady rate of prolonged hydrolysis of the sodium borohydride pellets. The rate of the water/defoamer solution was is 0.374 mL/min during an initial preadsorption period.

Figure 18:
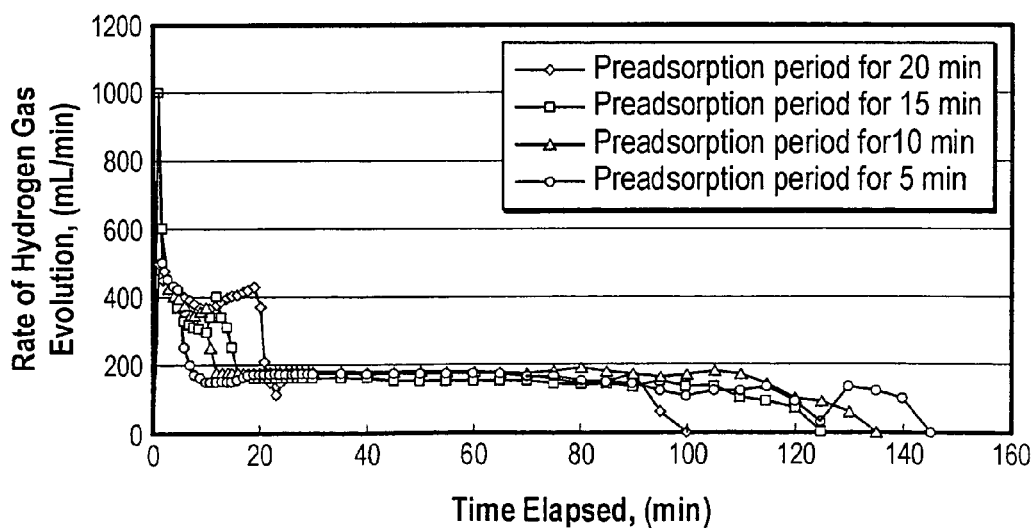
FIG. 18 is a graph demonstrating that the rate of hydrogen generation can be prolonged by reducing the rate of delivery for the aqueous hydrolysis solution after an initial reaction initiation period.

The results provided in FIG. 18 show that the minimum preadsorption time can be as little as 5 minutes with an ensuing steady flow of hydrogen gas that can extend for an additional 110 minutes. If the pellets are wetted at an initial rate of 0.374 mL/min for 5 to 20 minutes, the overall duration of the hydrolysis reaction may be prolonged by a shift in delivery rate to as little as 0.15 mL/min. A target flow of 120 mL $H_2$ per minute is met or exceeded for a duration of about two hours when the solution delivery rate thereafter is slowed to as little as 0.15 mL/min. The initial surge of water serves to rapidly wet a substantial amount of the hydride, which promotes a stable reaction thereafter. The initial surge of hydrogen is useful for insuring that the fuel cell is quickly purged of inert gases that may have been present in storage.

Figure 19:
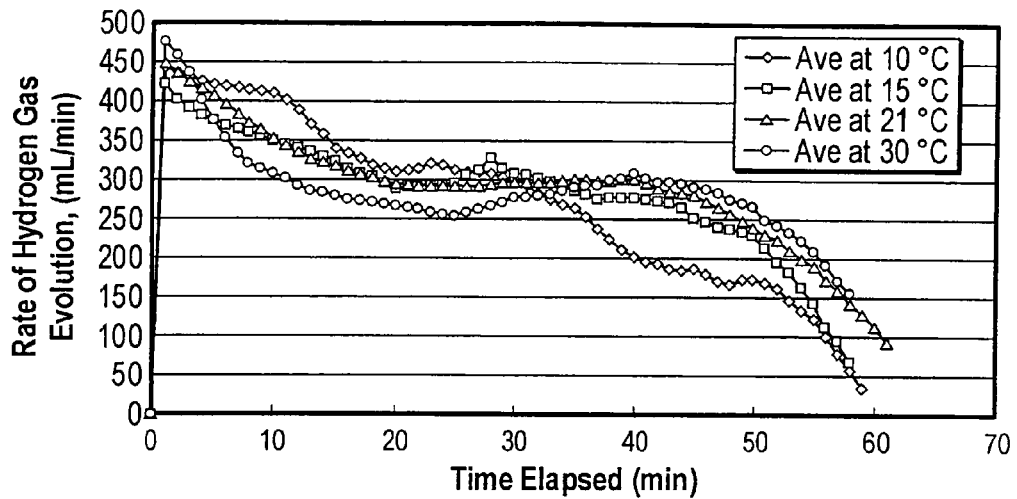
FIG. 19 is a graph indicating the temperature dependence for averaged rates of hydrolysis for 178 mmol sodium borohydride with 8.17 wt % ruthenium chloride catalyst.

The results of varying the temperature under these conditions are shown in FIG. 19. It is apparent that the average hydrolysis rates appear in a cluster over the temperature range from 15° C. to 30° C., but that the average rate obtained at 10° C. falls below this cluster. It may be seen from these results that the actively controlled hydrogen generator is useful over a wide temperature range.

EXAMPLE 17

Effect of Changes in the Feed Rate of the Aqueous Solution

Figure 20:
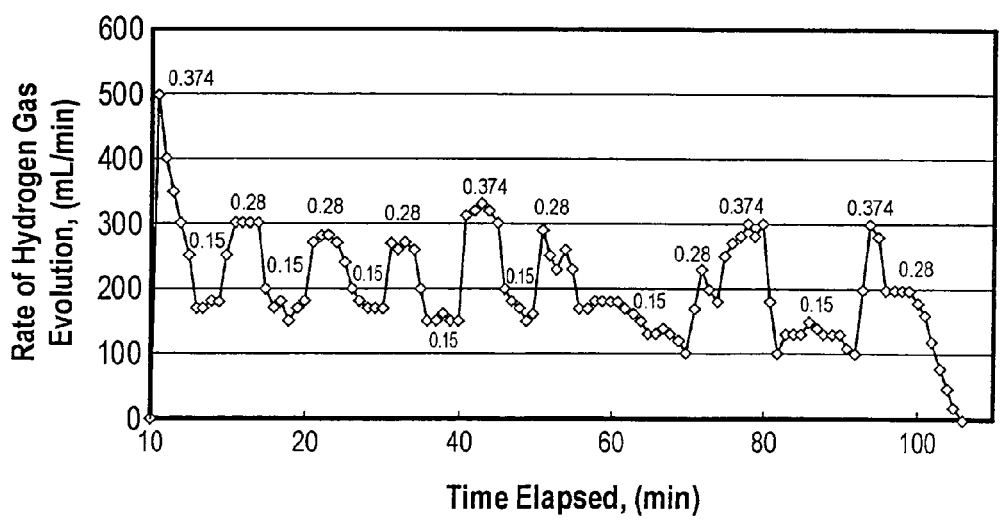
FIG. 20 is a graph demonstrating that frequent changes in the rate of addition of the antifoam solution result in rapid responses of hydrogen generation rate when the solution is combined with borohydride pellets.

Rates of hydrogen generation may also be varied in response to rapid changes in the flow of the aqueous solution containing an antifoam agent where it is important for the fuel cell to follow a varying load demand. FIG. 20 shows the profile of response of the generator to frequent changes in rate of delivery of antifoam solution to the generator bag. For cycling between an energy demand requiring 270 mL $H_2$ per minute and a lower level energy demand requiring 120 mL $H_2$/min, the packet style generator will perform reliably and at repeated rates for about an hour. Although performance for the high demand portion of the cycle falls off with time, the low demand performance is virtually invariant. The generator tends to respond to changes in rate of aqueous solution within 20 to 40 seconds. The values of the aqueous solution delivery rates shown in FIG. 20 are expressed in units of mL/min. The size of the packet generator was 3½ in by 5 in. Water with 50 ppm "C-2245" antifoam agent was delivered by a variable speed syringe pump and hydrogen flow was monitored (after drying) with a hydrogen mass flow monitor. The ambient temperature was about 22° C.

EXAMPLE 18

Preparation of a Blend of Catalyzed Hydride

A quantity of tetrahydrofuran (THF) is rigorously dried by stirring with freshly dried 3A molecular sieve for sixteen hours in a closed flask. The solvent is allowed to remain in contact with the sieves until used. The flask of THF is transferred into a glove bag, with the other ingredients for the mixture, and the bag thoroughly purged with dry argon.

Under the inert atmosphere of the glove bag, 200 mL of the solvent is filtered into a round bottomed flask, 30 g of sodium borohydride added, and the mixture stirred until the borohydride dissolved. While the borohydride dissolves, an additional 30 mL of THF is filtered and placed in a small Erlenmeyer flask along with 0.5 g of ruthenium acetylacetonate ($Ru(C_5H_7O_2)_3$). The flask is swirled by hand until a clear solution is produced. The two solutions are combined and the flask stoppered for removal from the glove bag.

The flask containing the solution is connected to a rotary evaporator with a condenser cooled to below 10° C. and evacuated. The flask is rotated and heated with a warm water bath until all of the solvent evaporates. The flask with the dried material is returned to the glove box bag, the bag purged, and the material placed in a tightly sealed bottle until ready for use.

EXAMPLE 19

Preparation of a Blend of Catalyzed Hydride Using Ammonia

This process is carried out in a sealed system for protection from noxious fumes. A quantity of anhydrous ammonia is rigorously dried by stirring under pressure at ambient temperature with sodium and the vessel with the ammonia connected via a common manifold with the other vessels used in this process. Quantities of 104 g of sodium borohydride and 2 g of cobalt acetylacetonate ($Co(C_5H_7O2)_3$) are weighed into separate containers and connected to the manifold so that the $Co(C_5H_7O_2)_3$ could be mixed with the sodium borohydride after both are dissolved in the ammonia.

The borohydride container is cooled with a dry ice-acetone bath and the container of ammonia slightly opened. Sufficient ammonia is distilled into the container to supply 100 g of solvent. The container is closed, allowed to warm, and the borohydride dissolved. Sufficient ammonia is distilled into the $Co(C_5H_7O_2)_3$ container to provide 20 g of solvent. The container is closed, allowed to warm, and the $Co(C_5H_7O_2)_3$ dissolved. The two solutions are then mixed together.

The container of mixed ingredients is sealed, disconnected from the manifold and connected, via an atomizing nozzle, to a large, evacuable chamber in an orientation that allows the solution to be sprayed into the chamber as a liquid. The chamber is evacuated and the vacuum pump left running to maintain a dynamic vacuum. The solution is gradually sprayed into the chamber where the ammonia flashes off as a vapor, leaving a solid blend of sodium borohydride and $Co(C_5H_7O_2)_3$. The mixture of solids is collected at the bottom and the gas removed from the top.

It will be understood from the foregoing description that various modifications and changes may be made in the preferred and alternative embodiments of the present invention without departing from its true spirit. This description is intended for purposes of illustration only and should not be construed in a limiting sense. The scope of this invention should be determined only by the language of the claims that follow.

What is claimed is:

1. A hydrogen generator, comprising:
a reaction chamber for containing a hydrogen-containing composition comprising a hydride and a catalyst, the hydrogen-containing composition having a set catalyst concentration to provide an expected rate of hydrogen gas generation upon adding an aqueous solution into the reaction chamber;
wherein the set catalyst concentration is between about 0.1 wt % and about 15 wt % active element or elements of the catalyst, based on the total amount of hydrogen-containing composition and the active element or elements in the catalyst.

2. The hydrogen generator of claim 1, further comprising:
means coupled to an inlet port of the reaction chamber for adding the aqueous solution all at once into the reaction chamber.

3. The hydrogen generator of claim 2, wherein the means for adding the aqueous solution is detachably coupled to the inlet port.

4. The hydrogen generator of claim 2, wherein the inlet port comprises a first fluid control device for controlling flow through the inlet port.

5. The hydrogen generator of claim 1, further comprising:
an outlet port of the reaction chamber.

6. The hydrogen generator of claim 5, wherein the outlet port comprises a second fluid control device for controlling flow through the outlet port.

7. The hydrogen generator of claim 1, wherein the hydride is of a light metal selected from lithium, sodium, potassium, rubidium, cesium, magnesium, beryllium, calcium, aluminum or combinations thereof.

8. The hydrogen generator of claim 1, wherein the hydride comprises one or more covalent hydrides.

9. The hydrogen generator of claim 8, wherein the covalent hydride is a borohydride, an alanate, or combinations thereof.

10. The hydrogen generator of claim 1, wherein the catalyst comprises one or more precious metals.

11. The hydrogen generator of claim 1, wherein the catalyst comprises ruthenium.

12. The hydrogen generator of claim 1, wherein the catalyst is ruthenium, ruthenium chloride, or combinations thereof.

13. The hydrogen generator of claim 1, wherein the catalyst is cobalt, nickel, tungsten carbide or combinations thereof.

14. The hydrogen generator of claim 1, wherein the catalyst comprises one or more transition metals.

15. The hydrogen generator of claim 1, wherein the catalyst form is selected from powders, blacks, salts of the active metal, oxides, mixed oxides, organometallic compounds or combinations thereof.

16. The hydrogen generator of claim 1, wherein the catalyst is in a form of an active metal, an oxide, mixed oxides or combinations thereof, the hydrogen generator further comprises a support for supporting the catalyst on a surface of the support.

17. The hydrogen generator of claim 1, wherein the set catalyst concentration is between about 0.3 wt % and about 7 wt % active element or elements of the catalyst, based on the total amount of hydrogen-containing composition and the active element or elements in the catalyst.

18. The hydrogen generator of claim 1, wherein the hydrogen-containing composition is in a form of one or more pellets.

19. The hydrogen generator of claim 1, wherein the hydrogen-containing composition is pellets, granules, powder, tablets or combinations thereof.

20. The hydrogen generator of claim 1, wherein the hydrogen-containing composition further comprises a wicking agent.

21. The hydrogen generator of claim 20, wherein the wicking agent comprises a hydrophilic organic material.

22. The hydrogen generator of claim 20, wherein the wicking agent is selected from cellulose fibers, polyester, polyacrylamide or combinations thereof.

23. The hydrogen generator of claim 20, wherein the hydrogen-containing composition comprises at least 0.5 wt % wicking agent.

24. The hydrogen generator of claim 1, wherein the aqueous solution comprises at least 51% water.

25. The hydrogen generator of claim 24, wherein the aqueous solution further comprises an antifoam agent.

26. The hydrogen generator of claim 25, wherein the antifoam agent is a surfactant, a glycol, a polyol or combinations thereof.

27. The hydrogen generator of claim 24, wherein the aqueous solution further comprises an acid.

28. The hydrogen generator of claim 27, wherein the acid is selected from mineral acids, carboxylic acids, sulfonic acids, phosphoric acids or combinations thereof.

29. The hydrogen generator of claim 6, wherein the second fluid control device is a check valve, a ball valve, a gate valve, a globe valve, a needle valve or combinations thereof.

30. The hydrogen generator of claim 29, wherein the second fluid control device further comprises one or more actuators, the hydrogen generator further comprising a controller in communication with the one or more actuators via electronic or pneumatic means.

31. The hydrogen generator of claim 4, wherein the first fluid control device is a check valve, a ball valve, a gate valve, a globe valve, a needle valve or combinations thereof.

32. The hydrogen generator of claim 31, wherein the first fluid control device further comprises one or more actuators, the hydrogen generator further comprising a controller in communication with the one or more actuators via electronic or pneumatic means.

33. The hydrogen generator of claim 5, further comprising:
a fluid separation device for removing liquid from generated hydrogen gas, wherein the hydrogen gas flows through the fluid separation device to the outlet port.

34. The hydrogen generator of claim 1, wherein the hydrogen-containing composition is supported by a porous substrate.

35. The hydrogen generator of claim 34, wherein the porous substrate is a foam.

36. The hydrogen generator of claim 35, wherein the foam is metal.

37. The hydrogen generator of claim 35, wherein the foam is of a material selected from aluminum, nickel, copper, titanium, silver, stainless steel or carbon.

38. The hydrogen generator of claim 1, wherein a surface of the substrate is treated to increase a hydrophilic nature of the surface.

39. The hydrogen generator of claim 34, wherein pores of the porous substrate contain the hydrogen-containing composition.

40. The hydrogen generator of claim 34, wherein the porous substrate is a metal.

41. The hydrogen generator of claim 1, wherein said hydrogen generator is a passively controlled hydrogen generator.

* * * * *